United States Patent
Hancock

(10) Patent No.: US 8,676,861 B2
(45) Date of Patent: *Mar. 18, 2014

(54) SYSTEMS AND METHODS FOR CREATING AND USING IMBEDDED SHORTCODES AND SHORTENED PHYSICAL AND INTERNET ADDRESSES

(71) Applicant: WGRS Licensing Company, LLC, Irvine, CA (US)

(72) Inventor: S. Lee Hancock, Newport Beach, CA (US)

(73) Assignee: WGRS Licensing Company, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/965,013

(22) Filed: Aug. 12, 2013

(65) Prior Publication Data

US 2013/0332491 A1 Dec. 12, 2013

Related U.S. Application Data

(63) Continuation of application No. 13/040,252, filed on Mar. 3, 2011, now Pat. No. 8,510,348.

(60) Provisional application No. 61/310,164, filed on Mar. 3, 2010.

(51) Int. Cl.
*G06F 17/30* (2006.01)

(52) U.S. Cl.
USPC ............ 707/803; 707/790; 707/912; 707/922

(58) Field of Classification Search
USPC .................. 707/609, 802, 790, 803, 912, 922
See application file for complete search history.

(56) References Cited

U.S. PATENT DOCUMENTS

| | | | | |
|---|---|---|---|---|
| 6,161,012 A | * | 12/2000 | Fenton et al. | 455/432.2 |
| 6,560,456 B1 | * | 5/2003 | Lohtia et al. | 455/445 |
| 8,099,114 B2 | * | 1/2012 | Midkiff et al. | 455/466 |
| 8,260,662 B2 | * | 9/2012 | Kaplan | 705/14.1 |
| 8,291,027 B2 | * | 10/2012 | McAleer et al. | 709/206 |
| 2002/0016175 A1 | * | 2/2002 | Marce et al. | 455/466 |
| 2005/0180392 A1 | * | 8/2005 | Watkins | 370/352 |
| 2008/0070558 A1 | * | 3/2008 | Lovell | 455/414.1 |

(Continued)

OTHER PUBLICATIONS

Twitter, "Twitter Help Center/How to Find Your Twitter Short Code or Long Code", Jan. 4, 2013, pp. 1-3.*

(Continued)

*Primary Examiner* — Cheryl Lewis
(74) *Attorney, Agent, or Firm* — William A. English; Vista IP Law Group LLP

(57) ABSTRACT

Systems and methods are disclosed for creating and using imbedded Shortcodes. An imbedded Shortcode (ISC) and Shortcode may be uniquely associated with a full name that identifies an item of interest. The Shortcode may be visually identified when the full name is displayed by the ISC, which is select characters of the full name that are visually distinguished from the other characters of the full name. Thus, subsequent reference to the associated full name and its item of interest may be identified simply by using the Shortcode instead of the full name. For example, a user of an electronic device may observe the full name with the ISC in a visual display, and sequentially enter the characters of the Shortcode from the ISC into the electronic device to obtain additional information regarding the item of interest.

24 Claims, 21 Drawing Sheets

(56) References Cited

U.S. PATENT DOCUMENTS

2009/0061943 A1* 3/2009 Kamgaing-Kouam ....... 455/566
2012/0221962 A1* 8/2012 Lew et al. .................... 715/752
2012/0226759 A1* 9/2012 Lew et al. .................... 709/206
2012/0282953 A1* 11/2012 Butler, Sr. .................... 455/466

OTHER PUBLICATIONS

Rudy Schusteritsch, Shailendra Rao, and Kerry Rodden, "Mobile Search with Text Messages: Designing the User Experience for Google SMS", CHI 2005, Apr. 2-7, 2005, ACM, pp. 1777-1780.*

* cited by examiner

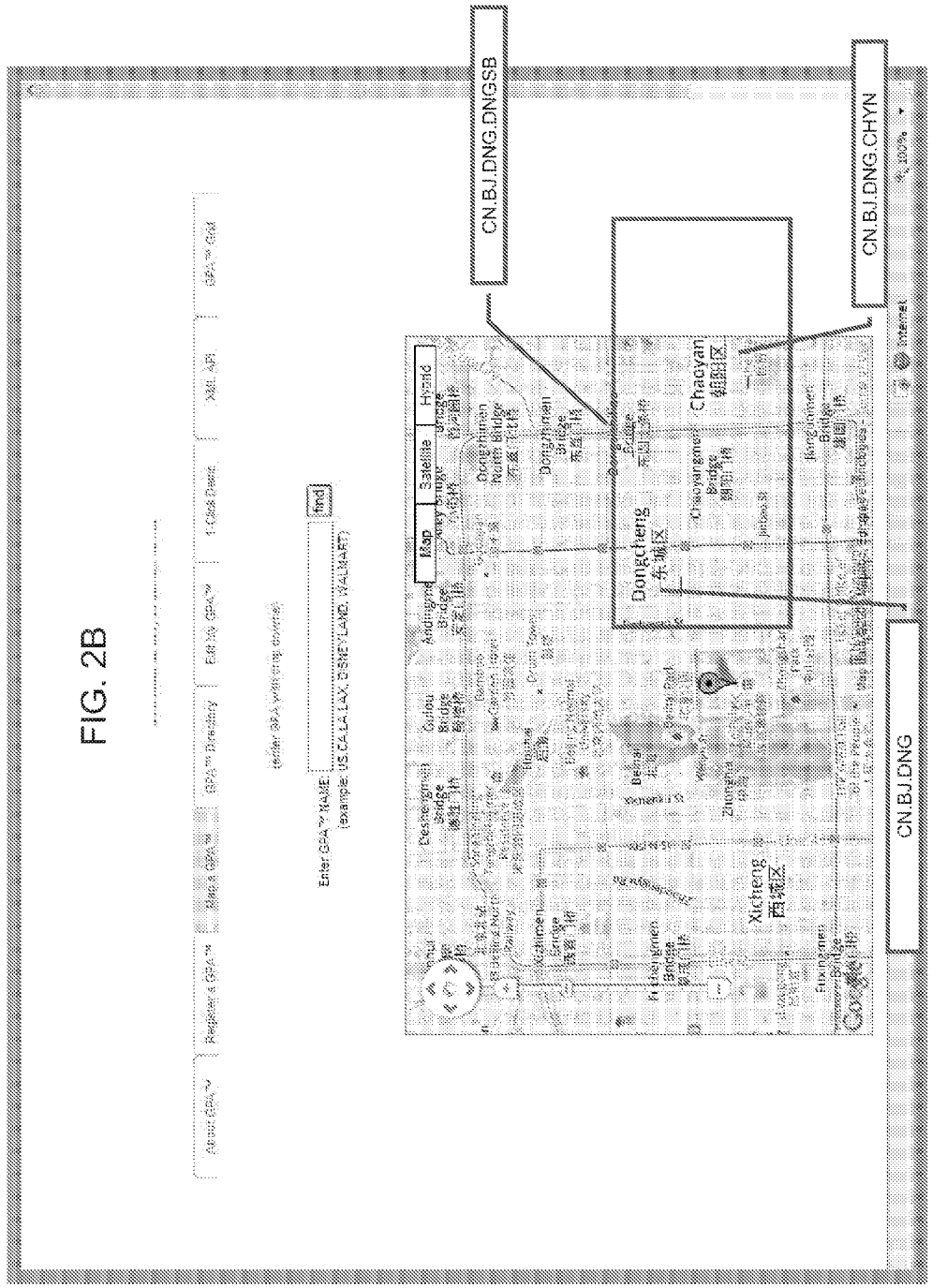

Display of Forbidden City
and other ISCs (Dongcheng
and Chaoyang)

Display of Forbidden
City
And Related Information

Note that there are dozens of businesses located in the high rise office buildings displayed within the area shown on this map and showing the full name of all of them is impractical.

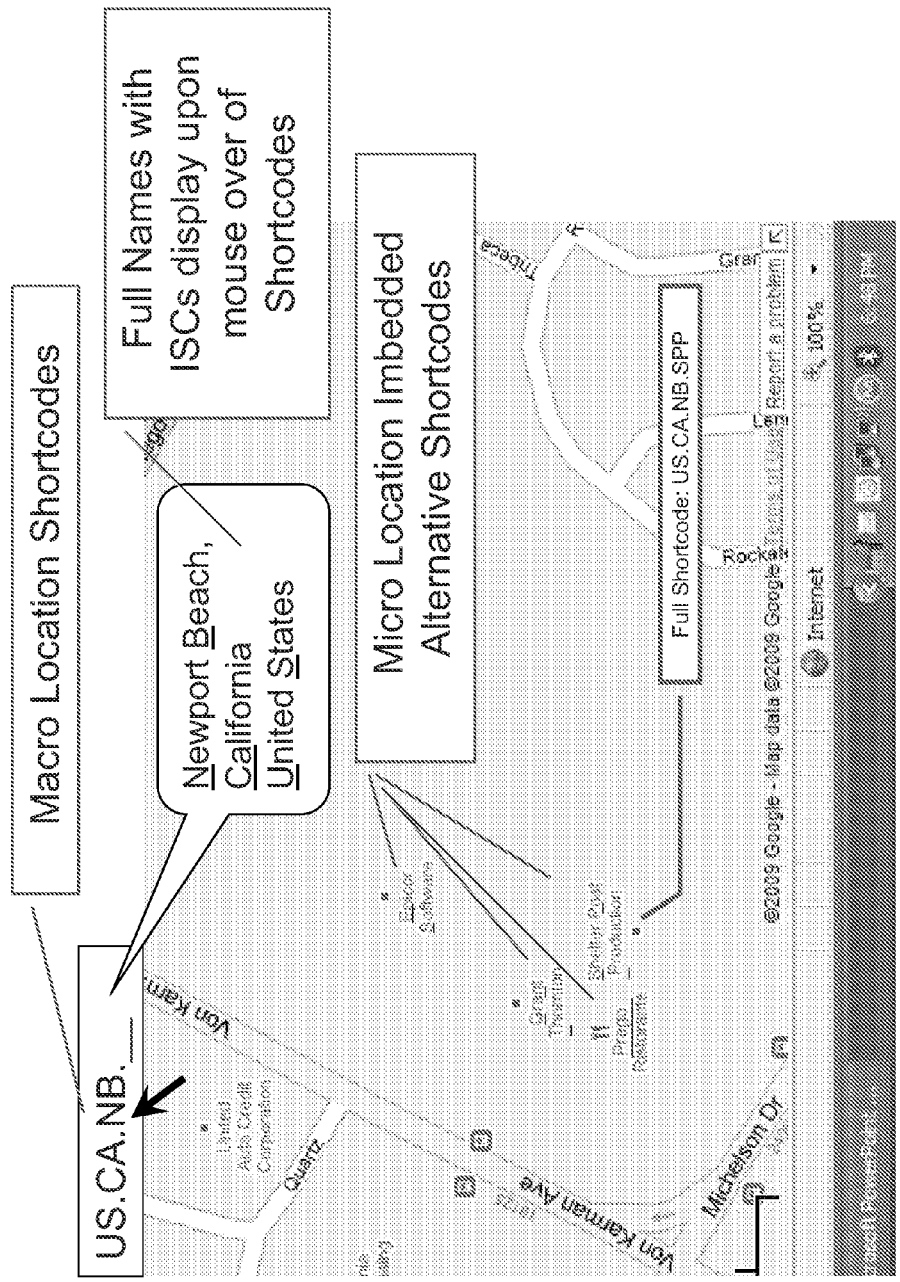

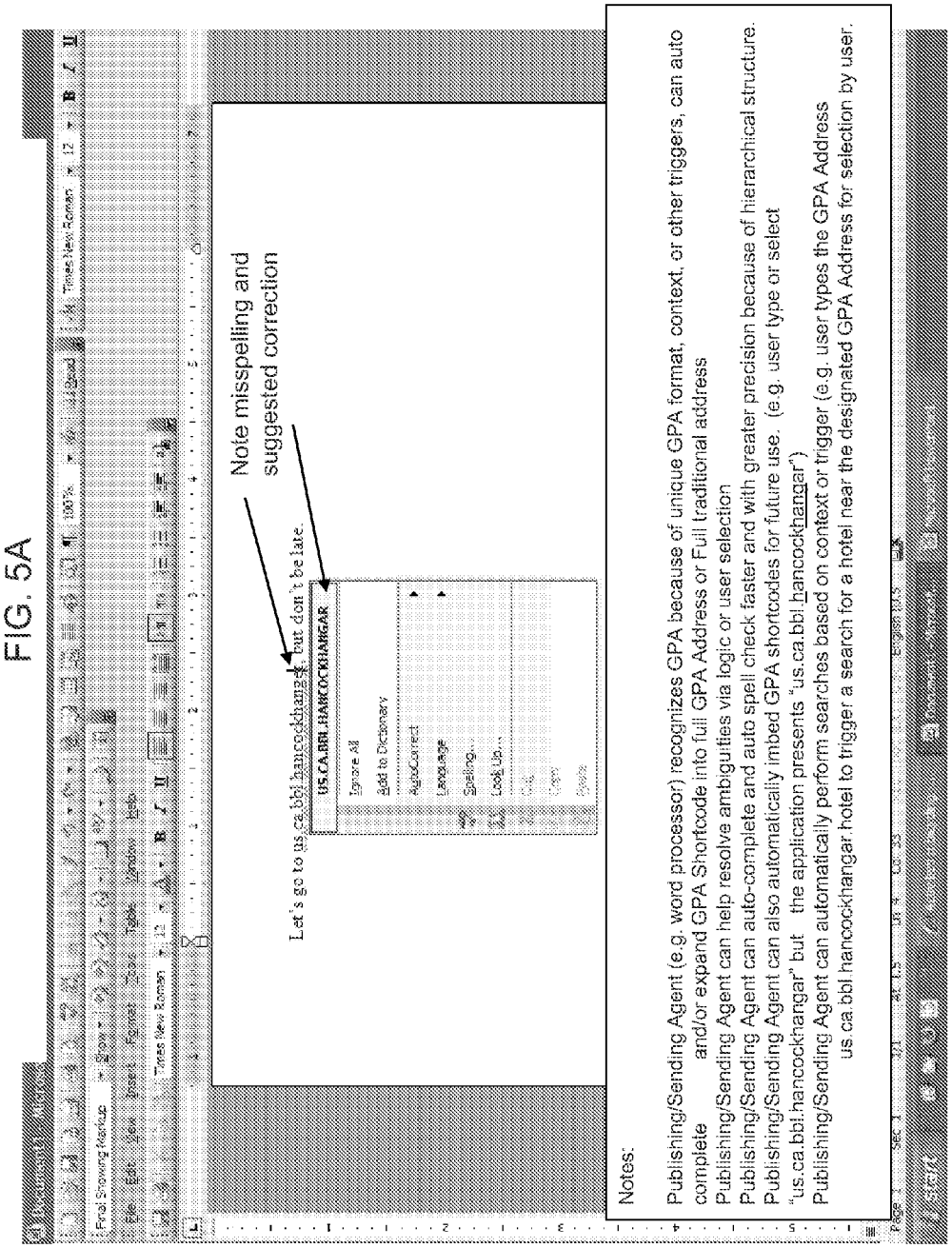

Imbedded Alternative Shortcode Components:

Magazine: EW

Issue Date: 2.5.10

Page No.: 53

Articles (Movies): Zland, Amelia, Time Traveler

Example Combined Alternative Shortcodes

This page of this EW Magazine

EW.2.5.10.p53

Zombieland Movie:
EW.2.5.10.p53.Zland

Or

EW.Zland

Imbedded Shortcode Components:

| | | |
|---|---|---|
| State: | Missouri | MO |
| City: | Branson | BSN |
| Brand: | Surrey Inn | SI |
| Destination: | Surrey Inn | SI |
| Coupon: | 15 | 15 |

Example Combined Shortcodes

Destination Address: US.MO.BSN.SI
This Coupon: HGC.WS2010.15
or
HGC.WS2010.P9.C15

SYSTEMS AND METHODS FOR CREATING AND USING IMBEDDED SHORTCODES AND SHORTENED PHYSICAL AND INTERNET ADDRESSES

RELATED APPLICATION DATA

This application is a continuation of application Ser. No. 13/040,252, filed Mar. 3, 2011, and issuing as U.S. Pat. No. 8,510,348, which claims benefit of provisional application Ser. No. 61/310,164, filed Mar. 3, 2010, the entire disclosures of which are expressly incorporated by reference herein.

FIELD OF THE INVENTION

This invention relates to systems and methods for facilitating the creation, distribution, presentation, publication, and/or use of imbedded shortcodes, particularly geographic identifiers, e.g., in text, maps, URL Addresses, video and static images through digital, print and other visual media and systems, e.g., for output display, input, user interface, and processing with computers, personal vehicle navigation systems, mobile phones, and other digital devices.

BACKGROUND

The use of digital media and services to facilitate communication, advertising, and information distribution has evolved significantly in the past few decades in many respects: the volume and granularity of information available at any time over the Internet and other networks, the mass adoption and use of electronic devices and interfaces, particularly small portable devices, used to request, acquire, and view such information, and the volume of communications of all types—consumer, business, governmental, etc.—but especially short, abbreviated messages such as SMS and other text messages.

In addition to exponential growth of online digital information products and services, including search, the new and rapidly evolving digital ecosystem has created numerous new electronic person to person(s) and application to person(s) communications media, including email, SMS, MMS, and instant messaging, social networking, digital chat rooms and other types of typed or printed electronic communications. These services, e.g., Twitter, generate trillions of communications, including short text messages and/or images in both one to one and one to many distribution platforms. One of the new characteristics of SMS and other messaging, whether through Twitter or otherwise, is the proliferation of abbreviations, keywords, shortened URL addresses, shortcodes, and other techniques (collectively "Shortcodes") used to reference and/or otherwise communicate through these services with a minimum number of characters.

Another important technology development is the ability to quickly determine, utilize, store, communicate, and retrieve very precise location information that is being used in a new category of goods and services generally referred to as location-based services ("LBS"). LBS have rapidly evolved into a new industry, perhaps several new industries, enabling numerous and varied LBS products, applications, and services through numerous types of electronic devices (e.g., mobile phones, in-vehicle and personal navigation devices (PNDs), portable digital media players, etc.) as well as through online and mobile internet websites, applications, services, and media. Many of these devices and services visually display maps, content, and related information, including advertising, through various videos, images, text, icons, names, etc. A growing and now common characteristic of many of these devices is an emphasis on small size and portability, resulting in smaller screen sizes, keypads, keyboards, and other input mechanisms, thereby creating a premium for highly efficient methods of identifying, displaying, selecting, communicating, inputting information, and/or otherwise interacting with these devices.

Despite the proliferation and growth of LBS services delivered through digital devices and electronic communications, printed and other visual materials and imagery remain as significant media to display location-based information. Printed materials may include paper maps, handouts, brochures, books, newspapers, magazines, business cards, flyers, billboards, posters, etc. There is a significant need to continue to utilize such materials and imagery as well as to provide methods and solutions that facilitate the converging interactive use of both print and digital media by users, as well as the migration of users from traditional print media to digital media.

Today, there are numerous LBS services delivered over hundreds of platforms and devices, all of which typically include some form of user interface to interact with the device, imagery, and information. One of the problems associated with the reduction in size of devices and the increase in capabilities is the difficulty of presenting more and more information on these smaller devices such as mobile phones, PNDs, connected watches and jewelry, and other devices. This reduction in size of screens and displays presents challenges that are exacerbated by the substantial increase in the amount of information that is available to end users through LBS and other services, thereby making it desirable to utilize icons, images, abbreviations, Shortcodes, and other techniques that are smaller yet easily understandable and usable by viewers.

While voice, bar code readers and other alternative communication methodologies are available in some of these devices, it would appear that the most prevalent form of input and output for all LBS services remains the physical input of numbers, letters, the selections of buttons, links, etc. through various types of keypads, keyboards, or other physical interfaces. While many devices have touch screens, there is often still a need for displaying text on those screens, and there is typically an ongoing need for entering text, typing, or otherwise selecting or inputting words, letters, numbers, names, and abbreviations through keypads. This can be evidenced by the presence, in virtually all devices that utilize touch screens for user input, of digitized keypads or keyboards to facilitate traditional user input. Even where voice and other interfaces are available for input or output, there is still a need for features, systems, and methods that facilitate the parsing and interpretation of such input and output and expedite the brevity and efficacy of the communication to minimize errors resulting from background noise, inefficiency in voice recognition systems, language, dialects and accent obstacles, etc. In many cases, providers or users elect visual and physical input and output of various types, e.g., text, images, lists, etc., despite the presence of more and more functional voice interfaces for convenience (e.g., interaction in a crowded and/or noisy location) or because of less obvious but nevertheless meaningful obstacles associated with voice services such as basic and more complex human auditory recognition, memory, and association obstacles. One may casually observe consumers interacting with mobile phones to quickly learn that a substantial and growing portion of mobile phone usage and interaction today is with the display and keypad rather than voice.

Even though various dedicated devices and services may efficiently handle the visual and input/output communications needs in a closed interaction loop exclusively between the devices and the users of such devices and services, that efficiency may be greatly reduced when a user wants to write down, speak, or otherwise communicate such information to others and/or the user or another user wants to utilize such information with other devices and services. Therefore, in many cases input/output must be interoperable across various materials, devices, images and services.

There are numerous alphabets, characters, format approaches, languages, and other differences and barriers to communication and interoperability that may need to be eliminated or minimized. Sources estimate that worldwide there are over six thousand (6,000) languages, dozens of alphabets and scripts, over one hundred twenty (120) different postal address formats and over forty (40) personal name formats.

SUMMARY

The present invention is directed to systems and methods for facilitating the creation, distribution, presentation, publication, and/or use of "imbedded Shortcodes," as defined herein. Such imbedded Shortcodes may be used in lieu of or in connection with associated full, complete, longer names, words, keywords, URL addresses, physical addresses, and the like, e.g., in digital, print, and/or visual environments in a manner that may be easy, unambiguous, intuitive, human readable and interpretable, and require no or limited additional space for the display of Shortcodes. The systems and methods described herein may be particularly helpful regarding physical and Internet location names and addresses and the use of structured Shortcodes, including abbreviated URL addresses for Internet locations, and/or geographic identifiers and traditional physical addresses, e.g., used on printed and digital maps. In addition, such systems and methods may also be applied to virtually all other types of visual presentations or communications, e.g., through emails and one to one or one to many SMS, MMS, and/or other micro-blogging messaging services (e.g., Twitter), and all digital, print, and/or other visual media and advertising.

A globally recognized Shortcode system may be established that would be highly useful to both enable and encourage the use of standardized and human readable Shortcodes to reference physical and Internet addresses and locations in a standardized manner throughout the world. Yet a totally new global physical and Internet addressing and referencing system designed to replace existing systems would be difficult to create and unlikely to be adopted. What is needed is a globally recognized Shortcode addressing system that is simple, self-effecting, easy to use and remember, but that nevertheless maintains, integrates with, and leverages the various traditional street and other physical and Internet addressing systems currently in use today throughout various portions of the world.

The systems and methods herein generally include imbedding, designation, integration, and/or display of Shortcodes within the confines of and integrated with an associated full name or other more traditional display of the name, word, URL address, traditional street or other location address, or other character string, including the names of cities, states, streets, points of interest (POIs) on paper or digital maps, products or words, or URL addresses to which the associated imbedded Shortcode relates. As used herein, such imbedded Shortcodes may be referred to as an "Imbedded Shortcode" or an "ISC". Imbedded Shortcodes may provide a link to existing names, addresses, etc., yet help generate awareness of ISCs and provide a bridge to a new and more efficient Shortcode and communication system designed to meet the needs of current and future technologies and usage trends.

There have been numerous efforts to develop shorthand characters and abbreviated communications, and enhance man-machine interfaces, person to person communications, and/or person to machine communications over several decades. In recent years, a few of these efforts have been directed at the new digital age of devices and communications. A variety of bar code, image readers, and other tagging and identification systems have been developed and, when enabled with appropriate systems and equipment, may facilitate device to device communications. However, such systems provide nominal benefit to person to person communications or communications with devices that are not fully integrated or compatible with such capabilities. An advantage of the methods and systems described herein is that they may be easily combined with bar code, image readers, and/or other tagging and image identification systems to provide human readable Shortcodes along with such machine readable tags, for cognitive associational advantages and/or to provide greater interoperability and portability of such systems in the absence of the specialized devices capable of reading and interpreting such images.

The proliferation of short-messaging services (SMS) text services and communications has generated a great deal of spontaneous abbreviations and Shortcodes for various words and phrases, but that spontaneity has not catalyzed any meaningful organized structure, system or method of associating such abbreviations or shortcodes with the underlying and associated words, phrases or communications. There is some nominal de facto standardization among users, but they are highly localized and colloquial, and there is no system to help publishers (writers) or receivers (readers) learn, interpret, remember, and/or use such abbreviations and Shortcodes. There have been some efforts to develop systems for automatically abbreviating words, phrases, sentences, and even whole paragraphs, including numerous abbreviated or shorthand typing systems. A major obstacle to the adoption of such systems, however, is the ability to find ways to educate users and/or communicate the abbreviations or shorthand without tremendous effort to educate users as to both the existence of such systems as well as the specific abbreviations and Shortcodes to be used with such systems. Any efforts to display both the full words associated with such abbreviations or Shortcodes along with the associated Shortcodes is cumbersome, and there has been no way to communicate both the shortcode/abbreviation and the associated full word or name without presenting both the shortcode/abbreviation and the full word or name, which is contrary to the primary desire to abbreviate the length of the communication. A few such abbreviations and Shortcodes are used enough so as to generate adequate awareness and knowledge, but the process is extremely inefficient and may impede the development and/or proliferation of any such system.

One of the key problems associated with any abbreviation or Shortcode schema is the ability of users to become aware of, remember, and effectively use such a system. For example, while it may be relatively easy for users to remember the various two letter state codes for the fifty (50) states of the United States, it is likely that many people in the United States cannot remember all of such codes, and it is very unlikely that people who are unfamiliar with the United States will be able to know, remember, or effectively use such codes. Similarly, any method of assigning Shortcodes to other terms, including cities, streets, POIs, etc. may be faced with two formidable challenges: 1) making users aware of both the presence and availability of any such system, and 2) helping users to learn, remember, and use any such Shortcodes enough to make them easier, quicker, and more effective than other alternatives.

The systems and methods disclosed herein may help accomplish these objectives, perhaps even to the point of causing users of various communications and information systems to automatically and subliminally learn and associate the appropriate imbedded Shortcode/abbreviation with the associated full name so that the efficacies of Shortcodes and abbreviations may be more fully achieved on a much broader and massive scale throughout the world. In addition or alternatively, the systems and methods disclosed herein may facilitate the adoption, use, and efficacy of new information acquisition, management, retrieval, and distribution systems throughout the world, particularly those associated with micro-location information where the designation and determination of locations may be an obstacle to providing appropriately localized information.

In the context of text messaging and microblogging applications and services, because of the strong desire to limit the number of characters of messages, services have developed to convert traditional URL addresses into extremely abbreviated URL addresses for inclusion in such messages. While such abbreviated URL addresses are short, they are not human readable or interpretable, and in fact merely provide a link to a database containing the longer URL address to which the abbreviated address relates. They are typically composed of a series of random characters, and they rarely communicate any meaningful information to the end user. Instead, they are only intended to provide a shorter electronic link or Internet address to more information. Nor are they designed or intended to be interoperable from the standpoint of the user writing down, remembering, or inputting the shortened URL Address into another device of system. What is needed is a new form of short addresses, or Shortcodes, that are, typically and in most appropriate circumstances, both human and computer friendly and readable and that provide users: a) with the ability to associate the characters in such Shortcodes, with the information to which such Shortcodes relate, even to the point of being able to interpret the Shortcodes, and b) with the ability to remember, write down, communicate, input, or otherwise use the Shortcodes in other devices or systems. Advantageously, the systems and methods described herein may enable the communication of precise location information, including a hyperlink to an ISC Enabled URL Shortened Address (as defined below) with less characters than would normally be required to describe the address in a text message, without the corresponding hyperlink, thereby effectively allowing two communications (the description and the hyperlink) to be included in the message with less characters than would be required merely to identify the precise location information. This may result in a significant reduction in the characters required to communicate the location information and/or a corresponding increase in the characters available for other information.

In the context of location-based services, one of the most common pieces of information input into electronic devices are physical addresses and other locations, typically by a traditional keypad or keyboard input or the selection of a series of numbers and letters to compose or select names of cities, states, other political subdivisions, street numbers, street names, postal codes, and/or other numbers related to traditional street addresses. These are typically composed of countries, states, cities, boroughs, counties, townships, streets, street addresses, apartments, suite of office numbers, and postal codes. Inputting these addresses, either to select a destination or to designate a specific location for other purposes (e.g., a local search in a particular area or near a specific location) may be cumbersome, time consuming, distracting, and ineffective. In the worst cases, it may create unsafe situations that affect public safety (e.g., distracted driving).

Regarding location-based services and addresses, various alternative location naming and designation systems have been proposed and documented. For example, U.S. Pat. No. 5,839,088, ("the '088 patent") and U.S. Publication No. 2005/0283503, the entire disclosures of which are expressly incorporated by reference herein, teach systems and methods for establishing and using different types of abbreviated addresses e.g., a Proprietary Locational Address ("PLA") and a Universal Locational Address ("ULA") as a simple, yet more truncated addressing system to supplement traditional street addresses and latitude longitude coordinates. For purposes of the present application, PLAs and ULAs are considered to be one form of Shortcodes that may be within the penumbra of the systems and methods described herein and are thus alternatively referred to herein as such. These references disclose using various Shortcodes and include various examples of how these Shortcodes, together with related map codes and/or other components of PLAs and ULAs described therein, may be included and/or displayed on paper and digital maps. In the examples included in these references, the Shortcodes may be displayed on digital and printed maps with specific icons or other identifiers prior to such Shortcodes to designate that the subsequent character string constitutes a PLA or ULA for various locations or POIs along with the associated full, traditional name of the POI. Such presentation may include additional imagery or information on the face of the digital or printed map, which may take up space in the presentation and therefore may reduce the available space for other information desired to be presented on the map. In the context of the limited space available on a map, including both the full name and the corresponding Shortcode for every city, state, street, and/or POI may be impractical or create ambiguity, confusion, and/or map clutter.

One of the problems regarding potential ambiguity is whether a specific Shortcode is associated with a particular full name, and whether that specific Shortcode is associated with a particular point or geographic feature. It would be easy to associate a full name with a particular POI or feature and incorrectly associate the corresponding Shortcode with a different (and incorrect) point or feature. Cartographers and programmers desiring to display and use Shortcodes on maps are therefore forced to consider the advantages and disadvantages of including these Shortcodes as well as any flag, trigger, or other indicator used to identify the Shortcode. These considerations may be a significant impediment to the adoption and use of Shortcodes in physical and digital maps, thereby reducing their availability for use in mobile phones and portable devices where their use may enhance usability, efficiency and safety.

Despite the proliferation of printed and digital maps, another problem associated with the presentation of Shortcodes is that additional space on the map is required to display both the Shortcode and the associated name of the feature, again resulting in potential confusion, ambiguity, and/or map clutter. Yet for Shortcodes to be effective, it is useful that these codes be displayed visually so that users may see, interpret, use, and/or potentially learn and remember them for future use with the initial or other devices and services.

A few unique features of digital maps are becoming more prevalently used over mobile phones, online, and with various electronic devices such as PNDs. For example, digital maps typically work at substantially different scales (e.g., zoomed in and zoomed out) ranging from a view of the entire globe or country (e.g., Russia) to a view of a few houses on a street. A paradox of this substantial variance in scaling (which also applies to differently scaled printed maps except for the absence of the variable scaling capabilities) is that, the more land mass that is shown on the map, the more information there is to present, but the space available to present the information is less. In addition, satellite imagery is now readily available and thus individual houses, buildings, and virtually unlimited features are often displayed through these images, increasing the number of human identifiable features exponentially. Efforts to label, identify, or provide additional information about these numerous features may conflict with the space available to display any name, link, or Shortcode, further impeding the use of names and Shortcodes. Certain information is generally presented, e.g., that is more critical to the overall presentation of the map, thereby leaving little room for less critical names, Shortcodes, and/or other designators.

Reduced font sizes may only go so far to increase the number of names that may be presented on a map as there are physical limitations to the user's ability to read and interpret names of infinitely diminishing font sizes. There is simply a point where users cannot physically see and read all of the information desired to be presented. Traditional map making and cartography dealt with these issues in various ways despite the confines of printed maps. In contrast, digital map presentations typically have the ability to dynamically display more or less information and/or names, e.g., for countries, states, cities, POIs, streets, etc., in different sizes at different scales, e.g., as determined by the designers of the system and/or selected by the users. Yet these problems remain for digital maps, and in fact may be exacerbated because of the need to be able to adjust the scale and display dynamically as the user or program changes the scale of the presentation.

Another unique capability of digital maps is the ability to provide interactive information on demand (e.g., displaying a full name or other information in an information box that pops up as a user selects a POI), thereby making it more advantageous to display an abbreviated reference or Shortcode that may easily be expanded to the full name if so desired by the users. Yet this capability has its limitations and obstacles if digital map providers try to imbed links or shortcodes for millions of map features that may be shown at various scales.

Unlike the physical limitations on font size and readability, some or all users may have a virtually unlimited capability to learn and remember relevant names, Shortcodes, and particularly Imbedded Shortcodes (or "ISCs"), as described herein, for those places, names, features, and/or products that are more important and/or relevant to them, frequently used, or otherwise memorable. It is possible that, by leveraging the users' ability to see, learn, and recall ISCs, presentation systems may be designed and operated that are more effective at conveying substantially more information, or, at the very least, including Shortcodes and abbreviated designators that link to more information than is currently possible without the use of such ISCs. As discussed below, one advantage of ISCs is the visual presentation of a Shortcode as part of and integrated with the associated full name, thereby facilitating the visualization of the ISCs along with the full associated name, providing memory and recall advantages.

Despite the proliferation of printed and digital maps and the capability of using Shortcodes and abbreviations such as PLAs, no one has devised a system or method for displaying such Shortcodes and abbreviations together with the associated full names in a manner that doesn't require additional space, add to map clutter, and/or create at least the possibility of erroneously associating a Shortcode or abbreviation with the wrong full name, feature, or POI. What is needed in connection with the use and display of Shortcodes in connection with paper and digital maps and other printed or visual materials is a way to minimize the size, area, or "real estate" required to include and display the Shortcode in an unambiguous way along with the associated full name in order to reduce the area required to display the Shortcode and increase the available area for other information, reduce map clutter and confusion, and/or generally communicate the availability, identity, and content of Shortcodes in an intuitive and effective way with nominal space and clutter.

In addition to the need for a more abbreviated and intuitive method of creating, using, and displaying Shortcodes in connection with LBS services and paper maps, there is a similar need for providing a more abbreviated and intuitive method of creating, using, and displaying Shortcodes in connection with others types of communications and related visual displays of other types of advertising, displays, presentations, and communications, including internet keywords, personal, business, or product names, concepts, and even ordinary and common words and other communications in the growing number of short and abbreviated e-mail, tweets, bulletin boards, notes on walls in Facebook, and numerous other short messages.

While the need for Shortcodes is evident in the examples provided, there is perhaps even more need when the full names of cities, streets, POIs, and other locations are presented in languages that are not native to the user. In such situations, Shortcodes may be substantially better and easier than the associated full names for the user because they are shorter and easier to read, remember, write down, communicate verbally, or perhaps input into a computer or other electronic device. However, presenting a map with only Shortcodes may not provide enough information and/or be effective for users who do not want or need to use Shortcodes.

Similar to providing ISCs or Shortcodes in printed and digital maps, there may be similar advantages to using ISCs in Internet URL addresses, e.g., to reference specific Internet and/or physical locations in a more human readable way. An Internet URL (Uniform Resource Locator) address specifies precise links to more information, images, or other content on the Internet. Since 2001, there have been numerous URL shortening services, (collectively "URL Address Shorteners") (e.g., tinyurl.com and bit.ly) that provide shortened URL addresses for Internet locations ("Shortened URL Addresses"). Today, Internet users may click on Shortened URL Addresses billions of times every month. However, these Shortened URL Addresses are typically random character strings that are used as key references to a database that contains a long associated URL string. Although some Shortened URL Addresses for Internet addresses are composed of words or phrases designed to be human readable, they are merely associated with the full URL via a database look-up. As such, they generally do not facilitate an end user interpreting and/or understanding the information underlying the Shortened URL Address from the Shortened URL Address itself. Nor do these Shortened URL Addresses provide any information that may be used outside of the Internet URL system, i.e., linking to the specific website or Internet page referenced by the Shortened URL Address.

One of the advantages of using ISCs and their related Shortcodes in Shortened URL Addresses for both Internet addresses and physical addresses is that Shortened URL Addresses including ISCs are both human readable and interpretable. This allows ISC imbedded messages to be operable across heterogeneous systems at multiple levels. For example, an ISC-enabled Shortened URL Address representing a physical address utilizing ISCs may provide optimum features and functionality when sent or received by an ISC-enabled program (e.g., additional information, ability to display either the Shortcode or the full associated names, and/or other functionality). However, even in the absence of an ISC-enabled sending or receiving program, the ISC-Enabled Shortened URL Address is nevertheless functional and helpful by a sending or receiving program that merely allows the user to access the Internet through the imbedded hyperlink including the ISC-enabled Shortened URL Address to obtain additional information and services related to that location. Further, even if a receiving program does not allow the ability to hyper link to an Internet location, the receiver may easily manually input the Shortened URL Address into an ISC-Enabled or non-ISC-Enabled device (e.g., a PND) to designate the location referenced in the Shortened URL Address or to visit the Internet location referenced by the Shortened URL Address. Finally, in the event that the user cannot use any of the foregoing options, the ISC-Enabled Shortened URL Address for a typical street address is human readable and interpretable in many cases. In such instances, the ISC-Enabled Shortened URL Address may be used without the assistance of any device.

Advantageously, ISCs may also be used for various components of names or information that are normally associated together, for example, physical and mailing addresses (e.g., the country, state/province, city/town, road, street no., etc.), and magazines (e.g., the magazine title, date, issue, page no., etc.). Such information represented by the ISCs may be generally easily discernable by most viewers through the use of standardized and structured abbreviations, rules, and algorithms and the imbedding of ISCs in the associated full names. This allows these Shortened URL Addresses and ISCs to indicate millions of physical addresses, Internet addresses, or pages in magazines in an abbreviated manner yet in a way that is repeatable, interpretable, memorable, and more easily and readily associated with the corresponding full names or other terms.

In accordance with one embodiment, a system and method are provided for creating and/or registering an imbedded Shortcode (ISC) for an associated word or words. For example, a descriptor, identifier, or other term may be commonly used to identify an item of interest (i.e., its "full name") and an ISC and corresponding Shortcode may be uniquely identified with the full name within an ISC database. The Shortcode may be visually identified when the full name is displayed by the ISC, which is select characters (e.g., alphabetic letters) of the full name that are visually distinguished from the other characters of the full name (i.e., the ISC will include less than all of the characters of the full name). Thus, subsequent reference to the associated full name and its item of interest may be identified simply by using the Shortcode instead of the full name. For example, a user of an electronic device may observe the full name with the ISC in a visual display, and sequentially enter the characters of the Shortcode identified by the ISC into the electronic device to obtain additional information regarding the item of interest. In exemplary embodiments, the item of interest may be a geographic entity, such as a country, city, or state, or other geographic place or feature; a brand name, associated with one or more physical locations or without physical locations; a name of a print or digitally displayed publication, book, article, image, or other component of printed materials; a domain name; a person; a song or other audio recording, an album, a speech, a video or other digital communication; and the like.

The Shortcode identified by the ISC may be as few as two or three characters (e.g., alphabetical letters or alphanumeric characters), while the full name includes more characters than the Shortcode. In an exemplary embodiment, the Shortcode may include a first letter of the full name and less than all of the remaining letters of the full name, the first two letters of the full name and less than all of the remaining letters of the full name, and the like.

In one embodiment, an ISC and associated Shortcode may be assigned to each full name in the ISC database by the manager of the ISC database. Alternatively, parties having an interest in items of interest may propose respective ISCs and Shortcodes for the full names of the items. The ISC database manager may review the proposed ISCs and Shortcodes and ensure that they do not conflict with others in the ISC database. Alternatively, the ISC database manager may provide a voting system by which interested parties may vote for ISCs and Shortcodes to associate with respective full names and/or a feedback system may be used to select ISCs and Shortcodes based on feedback, e.g., from users indicating whether the particular ISCs and Shortcodes are user friendly and/or commonly used.

In one method, the ISC database manager may resolve registered imbedded Shortcodes within the ISC database on a real-time basis. For example, any party may request a particular ISC and Shortcode to be uniquely associated with a particular full name within the database. The item of interest identified by the full name and/or information regarding the item may be included in the database. For example, where the item of interest is a document, article, recording, video, or other electronic media, the ISC database may include a centralized or distributed digital clearinghouse or other storage for storing a copy of the item. Alternatively, the ISC database may include a link to such items so that they may be provided to interested users. All or a portion of the centralized storage or clearinghouse may be retained in the ISC database and/or may be updated periodically or on demand from the centralized storage.

Optionally, in another method, the ISC database may combine Shortcodes from imbedded Shortcodes in a hierarchical order. For example, a full name may include different levels of identifiers for an item of interest, e.g., a location may be identified by its street address, then city, then state. The full name displayed on a visual display may include imbedded Shortcodes for each level included in the displayed full name. Subsequently, the item of interest may be succinctly yet precisely referenced by inputting the Shortcodes for each level of the full name to facilitate retrieving information about the item.

Once assigned, a full name with its ISC may be displayed in a variety of media, e.g., on print or other static displays, such as maps, billboards, magazines, advertizing materials, and the like, or on electronic displays, e.g., displays of electronic devices, televisions, and the like, to encourage use of the associated Shortcode.

For example, in accordance with another embodiment, a method is provided for accessing content related to an item of interest, which includes observing a display including a full name identifying an item of interest, the full name including an imbedded Shortcode defined by less than all of the characters of the full name; inputting the characters of the Shortcode defined by the imbedded Shortcode into an electronic device; and receiving on the electronic device additional information regarding the item of interest.

In accordance with another embodiment, a method is provided for displaying a Shortcode that includes visually displaying a full name for a location or other item of interest, the visual display including an imbedded Shortcode defined by less than all of the characters of the full name. For example, the visual display may display the imbedded Shortcode by visually distinguishing the characters of the Shortcode from the remaining characters of the full name. For example, the characters of the imbedded Shortcode may be in a different font or style, e.g., italicized, underlined, bolded, and the like, from the remaining characters in the full name. Thereafter, a person interested in accessing additional information regarding the location or other item of interest may enter the characters of the Shortcode into an electronic device to obtain additional information.

In an exemplary embodiment, the electronic device may be a mobile phone, personal navigation device, or other relatively small device, e.g., having a limited size keypad or other input mechanism. For example, the full name with imbedded Shortcode may be displayed on the electronic device's own display, on an external video display, e.g., on a television or computer monitor, on a printed medium, and the like.

In accordance with still another embodiment, a method is provided for creating a hierarchical, human readable address for locations. The address may include less than all of the characters of the full name of the location, e.g., by combining standardized Shortcodes for geopolitical subdivisions of the location, standardized or other Shortcodes for a street name of the location, and any alphanumeric component of the street address of the location. In an exemplary embodiment, the street name Shortcode may be created automatically by an algorithm of the ISC database, or otherwise created similar to the methods described elsewhere herein. The street name Shortcode may be checked for uniqueness within the relevant geopolitical subdivisions, e.g., to avoid duplicates. The alphanumeric component may be the alphanumeric component of the traditional street address and/or a suite, building, hall, office, etc. of the location.

For example, a Shortcode for a full name (in this case, street address), such as 2102 Business Center Drive, Irvine, Calif., Suite 130 may be us.ca.irv.2010BCD130, and the full name with imbedded Shortcode may be 2102 Business Center Drive, Irvine, Calif., Suite 130. The full name with ISC may be displayed on maps or other visual displays or may simply be used to facilitate interfacing with an electronic device.

In accordance with yet another embodiment, a method is provided for creating unique and special characters that may be selected directly and copied from any program to another with the special characters remaining intact. For example, separate characters may be identified within a program for a letter that is part of an imbedded Shortcode and the same letter that is not. For example, with McDonalds, the label of the letters for M, c and D may be special characters different than regular a M, c, and D (such as the second "d" in McDonalds), which may facilitate storing the associated Shortcode and/or ISC within the ISC database.

In accordance with still another embodiment, a system and method are provided for combining one or more Shortcodes with a search term and/or command. For example, the ISC database may associate ISCs with search terms and/or commands such that, when certain Shortcodes defined by the ISCs are input into an electronic device, the electronic device or a remote device communicating with the electronic device may automatically execute associated searches or commands. For example, the system or method may combine hierarchical Shortcodes with a search term in a manner that both designates a physical location, and requests a search for items related to the search term at or near the designated location.

Optionally, in accordance with another embodiment, when a Shortcode is input into an electronic device, the electronic device may automatically provide additional context to disambiguate the Shortcode. For example, the electronic device may automatically add a date and time, a current location of the electronic device, data from user preferences or history stored in memory of the electronic device, and the like to the Shortcode. The electronic device may then transmit the Shortcode and added information via an interface to a remote device to obtain information regarding an item associated with the Shortcode that also satisfies the added information.

In accordance with still another embodiment, a user interface may be provided on an electronic device that includes an input interface, e.g., a keypad and/or display, that segments various components of related Shortcodes on the device's display, e.g., to displays all or multiple possible combinations of the designated Shortcodes to allow the user to select the precise associated words intended by the Shortcode.

In accordance with yet another embodiment, a system and method for accessing information may be provided that includes an ISC database that associates multiple ISCs and Shortcodes with the same destination or other item of interest. The multiple ISCs and Shortcodes may be provided to different parties, e.g., to allow tracking the origin of the subsequent use of the Shortcode. For example, a Shortcode for San Francisco's Golden Gate Bridge may be sfmap.GGBridge, while another map may display SanFranMap.GGBridge. When a user subsequently inputs either Shortcode into an electronic device, the ISC database may point to the same item of interest, but may then track which map was used or originated the inquiry. Optionally, the Shortcode may result in the ISC database providing unique content based on the map used (e.g., information regarding the provider of the map over others). In addition or alternatively, the Shortcode may allow tracking, accounting for and/or incentivizing a source of the Shortcode (e.g., the provider of the map).

Thus, the systems and methods herein may reduce the number of characters needed to succinctly yet precisely identify or reference longer associated full names, particularly over mobile devices or sized-constrained communications. In addition, the ability to display both imbedded Shortcodes and their respective full names with no increase in the number of characters or clutter in a visual display and with no ambiguity regarding the connection between the full names and the associated imbedded Shortcodes.

For example, such Shortcodes may facilitate short messaging services such as Twitter, mobile displays, social network and other posts, blogs and communications, e.g., on portable, personal navigation devices. In addition, such Shortcodes may enhance information provided on maps, where every city and feature identified on the map may include an imbedded Shortcode to designate the location as a destination or to connect to information or services related to the destination.

Other aspects and features of the need for and use of the present invention will become apparent from consideration of the following description taken in conjunction with the accompanying drawings.

BRIEF DESCRIPTION OF THE DRAWINGS

The drawings illustrate exemplary embodiments of the invention, in which:

FIGS. 2A-2D are exemplary images of digital maps that may be displayed by an exemplary system including ISC capabilities (identified as GPA Earth), using Google Application Programming Interfaces. FIG. 2A illustrates the use of exemplary Shortcodes to designate and reference the country (China/CN), city (Beijing/BJ), district (Dongcheng/DNG) and location name (ForbiddenCity/FBDC). It also demonstrates the display of an ISC of FBDC for ForbiddenCity ("ForbiddenCity"). FIG. 2B illustrates exemplary ISCs imbedded in the associated full names for three locations: the District of Dongcheng (DNG), the Dongsishitiao Bridge (DNGSB), and the District of Chaoyang (CHYN). In addition, one type of a Shortcode, referred to as a GPA Address by the GPA Earth system, using the ISCs for China, Beijing, and each of these locations/districts are illustrated. They are: CN.BJ.DNG (the District of Dongcheng), CN.BJ.DNG.DNGBR (the Dongsishitiao Bridge), and CN.BJ.DNG.CHYN (the District of Chaoyang). FIG. 2C illustrates an exemplary method to input or select Shortcodes from ISCs into a website optimized for viewing on a mobile phone in order to select a location with minimal input, and FIG. 2D illustrates exemplary outputs from such a method with ISCs for the District of Dongcheng (DNG) and the District of Chaoyang (CHYN).

FIGS. 3A-3C are exemplary images of digital maps and a corresponding satellite image showing a few POIs that may be displayed using systems and methods herein, e.g., based images from Google Maps that may be accessed through an Internet browser. FIG. 3A illustrates the conventional presentation of a few location names on a digital map, e.g., by Google. It should be noted that the area where these location names are displayed includes five 10-story office buildings with dozens of tenants, so it would be extremely difficult to display all of the names of the companies operating within this area. FIGS. 3B and 3C are an exemplary images of digital maps from a system that includes ISCs to present both the location names and the Shortcode for such locations. Note that the images also present Shortcodes for the political subdivisions represented by the area shown on the maps (in this case United States (US), California (CA), and Newport Beach (NB)). FIG. 3C shows the ability of a user to obtain expanded information regarding all of such political subdivisions, including the presentation of the appropriate ISCs.

FIG. 4A illustrates the use of the ISCs for Shortcodes US, CA, MB and SKZ for United States, California, Manhattan Beach, and Sharkeez, respectively, as well as an exemplary combined Shortcode for this location, US.CA.MB.SKZ. FIG. 4B illustrates the provision of additional information for any ISC (e.g., Manhattan Beach), or location utilizing ISCs, including directions to/from the location, obtaining additional information, using, and forwarding the ISCs via email or text messaging, etc.

FIGS. 5A-5C are exemplary screen shots of various applications utilizing an example of an ISC and Shortcodes, in this case GPA Addresses, in publishing/sending and reading/receiving programs, that contain software codes proving ISC functionality, including a word processing program, e-mail program, and web-based e-mail application. FIGS. 5A-5C provide various examples of use and functionality that may utilize ISCs and their corresponding Shortcodes and associated full names in ways that facilitate the use of ISCs and their components by publishers and receivers.

FIG. 6A illustrates how ISCs may be used for name, issue, dates, page numbers, articles, and/or subjects (e.g., movies) in a magazine—in this case the Feb. 5, 2010 issue of Entertainment Week. FIG. 6B illustrates how an ISC may be used in the name and issue of a publication as well as the resulting associated Shortcodes, for a publication entitled Hotel Coupon Guide. FIG. 6C illustrates how ICSs may be used for geographic names, page references, and coupon references relating to one of the advertisers/coupons included in the Hotel Coupon Guide publication of FIG. 6B, as well as their ISC and associated Shortcodes.

DETAILED DESCRIPTION

Imbedded Shortcode Designation

Figure 1:
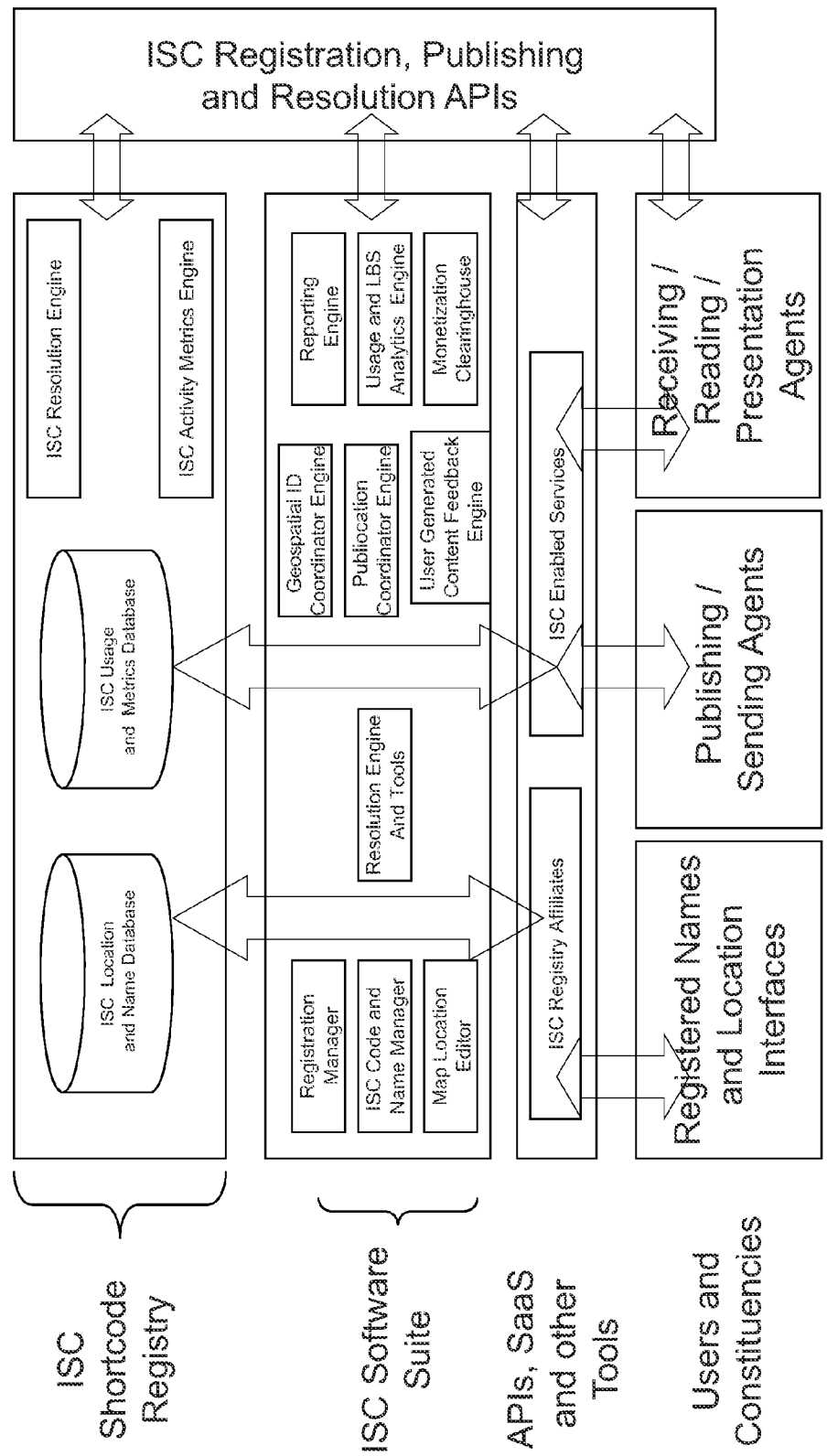
FIG. 1 is a diagram, showing component systems and relevant participants and relationships related to the determination, creation, curation, designation, registration, management, dissemination, display, use, and/or tracking of ISCs and related systems, methods and processes that may be included in an exemplary embodiment of an ISC System.

As explained above, one of the impediments to the adoption of geographic and other Shortcodes (e.g., the PLAs taught in the references incorporated by reference herein or shortened URL addresses or strings) is the additional space and/or characters required to designate and display Shortcodes.

The systems and methods described herein generally involve the presentation of standardized Shortcodes and shortened URL addresses or strings for physical addresses and Internet addresses, which may be further enhanced by the simultaneous presentation of both a Shortcode and a full name by designating the characters in the associated full name that constitute the Shortcode in such a way that the Shortcode may be efficiently imbedded and identified within the presentation and display of the associated full name. For example, the Shortcode DNGSBR for the Dongsishitiao Bridge in the Dongcheng District of Beijing, China, may be imbedded and designated entirely within the associated name Dongsishitiao Bridge as follows: Dongsishitiao Bridge, or any similar presentation that identified the Shortcode DNGBR as the characters in the full name that constitute the Shortcode. The advantage of this solution is that it requires virtually no additional space on a printed or digital map or other image or display beyond the space allocated to the associated full name, yet it clearly designates and associates both the Shortcode and the associated full name, and unambiguously associates the Shortcode with the appropriate geographic name or feature (in this case for a bridge). Advantageously, this unique presentation may also provide other advantages. Imbedding the Shortcodes in the associated name requires only one "insertion" or label for the features, in a map, and scaling of the full name for size and determining inclusion of the name for various map scales may automatically accomplish the scaling, sizing, and inclusion of the Imbedded Shortcodes. It is also therefore not necessary to make determinations as to when to omit Shortcodes. ISCs are likely to be remembered by users with visual cues and imagery because the ISCs are imbedded visually into the full name, so users who recall visually the full name may automatically recall the Imbedded Shortcode. Consistently displaying ISCs may also be used as a reminder and effective communication to viewers as to the availability of ISCs.

The systems and methods herein may include various elements, including the following:

a) systems and methods and rules for the creation of ISCs designed to ensure that ISCs: i) are either unique or otherwise unambiguously interpretable within the relevant set of locations or other designated names, and ii) meet the requirements of and are capable of being imbedded and designated within the associated full name in accordance with the concepts described herein. The creation of ISCs may be accomplished in a centralized or de-centralized manner through a registration process, and ISCs may be created on a one by one, case by case basis or en masse for multiple associated names (e.g., all of the cities in California) by applying scripts, programs, and database languages and capabilities to existing databases of associated names. Local user input and feedback may also be incorporated into these methods and systems, which may be designed to optimize the user of ISCs at local, regional, national and international levels;

b) a system and method for creating and automatically inputting, creating, storing, managing, referencing, manipulating, checking, copying, displaying, and/or otherwise using ISCs in computer software and programs, online and mobile Internet browsers and other systems, architectures and operating systems, including programming languages, navigation, database, mapping, word processing, messaging, chat/instant messaging, spreadsheet, and other programs in order to provide interoperability across heterogeneous systems, applications and programs to enable and meet the needs and requirements of the systems and methods described herein, including the possible creation of plug-ins, software agents or modules, and/or new and alternative character sets and character repertoires with markers or other imbedded characteristics and mechanisms, properties and specifications necessary to efficiently and uniformly input, create, store, manage, reference, manipulate, check, copy, display, and/or otherwise use ISCs. For example, these programs may need to be enabled to automatically and quickly and efficiently accept, store, copy, and alternatively present full names and ISCs by using new characters with integrated, human readable and imbedded markers as if they were just additional characters. This may be preferable to a system that requires computer coding and programming to display ISCs by combining the Shortcode and the associated name and adding the appropriate markers in order to display the ISC. In other words, creating and using an alternative character set may enable ISCs to be more readily and easily created, typed, copied, stored, and displayed as a single entry; and c) various systems and methods of alternatively using, displaying, encoding, and decoding Shortcodes and their corresponding associated full names along with the ISCs within the associated full names in a manner that may require no or nominal additional space, automatically and unambiguously associate the ISCs with their associated full names and the locations or other features associated with the full names so as to be recognized by users in a way that may make the users aware of ISCs and help them remember specific ISCs for future use.

Imbedded Shortcode Rules and Systems

While there may be numerous alternative rules, conventions, methods, and systems to govern the creation and use of ISCs, certain rules, conventions, methods and systems are helpful to ensure that ISCs may be effectively imbedded and displayed within the associated full name. For example, it may be advantageous if each Shortcode is composed solely of a series of letters that are contained within the full corresponding city, state, street, POI, feature, product, newspaper or magazine name, or other name and that such letters appear in the same order as such letters appear in the full name.

Display of Imbedded Shortcodes

The following examples illustrate various methods of imbedding and displaying different examples of ISCs for both physical locations, addresses, and other names. For ease and simplicity, the illustrated examples include geographic locations, but these methods may apply equally to any other use of Imbedded Shortcodes:

| Full Name or Term | Shortcode | Imbedded Shortcode (ISC) |
|---|---|---|
| Oriental Pearl Tower Hongkou, Shanghai China | CN.SH.HNG.OPT | China, Shanghai, Hongkou, Oriental Pearl Tower |
| Dongcheng, Beijing China | CN.BJ.DNG | Dongcheng, Beijing China |
| Forbidden City Dongcheng, Beijing China | CN.BJ.DNG.FBDC | Forbidden City Dongcheng, Beijing China |
| Dongsishitiao Bridge Dongcheng, Beijing China | CN.BJ.DNG.DNGSB | Dongsishitiao Bridge Dongcheng, Beijing China |
| Sharkeez Cantina | US.CA.MB.SKZ | Sharkeez Cantina |

-continued

| Full Name or Term | Shortcode | Imbedded Shortcode (ISC) |
|---|---|---|
| 3801 Highland Avenue<br>Manhattan Beach<br>California<br>United States<br>90266 | | 3801 Highland Avenue<br>Manhattan Beach<br>California<br>United States<br>90266 |
| Zombieland Review<br>Entertainment Week<br>2.5.2010<br>Page 53 | EW.Zland<br>Or<br>EW.2.5.10.p53.Zland | Zombieland Review<br>Entertainment Week<br>2.5.2010<br>Page 53 |
| Hotel Coupon Guide<br>Winter/Spring 2010<br>Page 9<br>Coupon 15 | HCG.WS2010.P9.C15 | Hotel Coupon Guide<br>Winter/Spring 2010<br>Page 9<br>Coupon 15 |
| Prego Ristorante<br>18433 Von Karman Ave.<br>Newport Beach, CA<br>92612 US | US.CA.NB.PREGO | Prego Ristorante<br>18433 Von Karman Ave.<br>Newport Beach<br>California<br>United States |
| Muskogee | MSKG | Muskogee |
| Oklahoma | OK | Oklahoma |
| Muskogee, Oklahoma | MSK.OG | Muskogee, Oklahoma |
| Orange County Dry Cleaning | OCCleaning | Orange County Dry Cleaning |
| Hal's Boat Repair | Hals | Hal's Boat Repair |
| Joe's American Bar and Grill | JBar | Joe's American Bar and Grill |
| 1743 North Hamilton Drive | 1743NHD | 1743 North Hamilton Drive |
| Orange County Dry Cleaning | OCCleaning | Orange County Dry Cleaning |
| Orange County Dry Cleaning | OCCleaning | *O*range *C*ounty Dry *Cleaning* |
| Orange County Dry Cleaning | OCCleaning | Orange County Dry Cleaning (with the letters of the ISC in a different color than the other letters) |
| Orange County Dry Cleaning | OCCleaning | Orange County Dry Cleaning |
| Ozarks Flying Service | FLY | Ozarks Flying Service |
| Ozarks Flying Service | FLY | Ozarks Flying Service |
| New Toyota Camry | New Camry | New Toyota Camry |
| Springfield, Missouri | SPFD.MO | Springfield, Missouri |
| 1743 North Hamilton Drive, Springfield, Missouri 64803 United States | US.MO.SPFD.1743NHD.64803 | 1743 North Hamilton Drive, Springfield, Missouri 64803 United States |

The foregoing descriptions and examples are illustrative of alternative uses and methods, but there are numerous other cases and implementations where the concepts described herein may be beneficial.

EXAMPLES

The following examples indicate some of the possible uses and/or alternative features of the concepts described herein.

Example 1

Figure 2A:
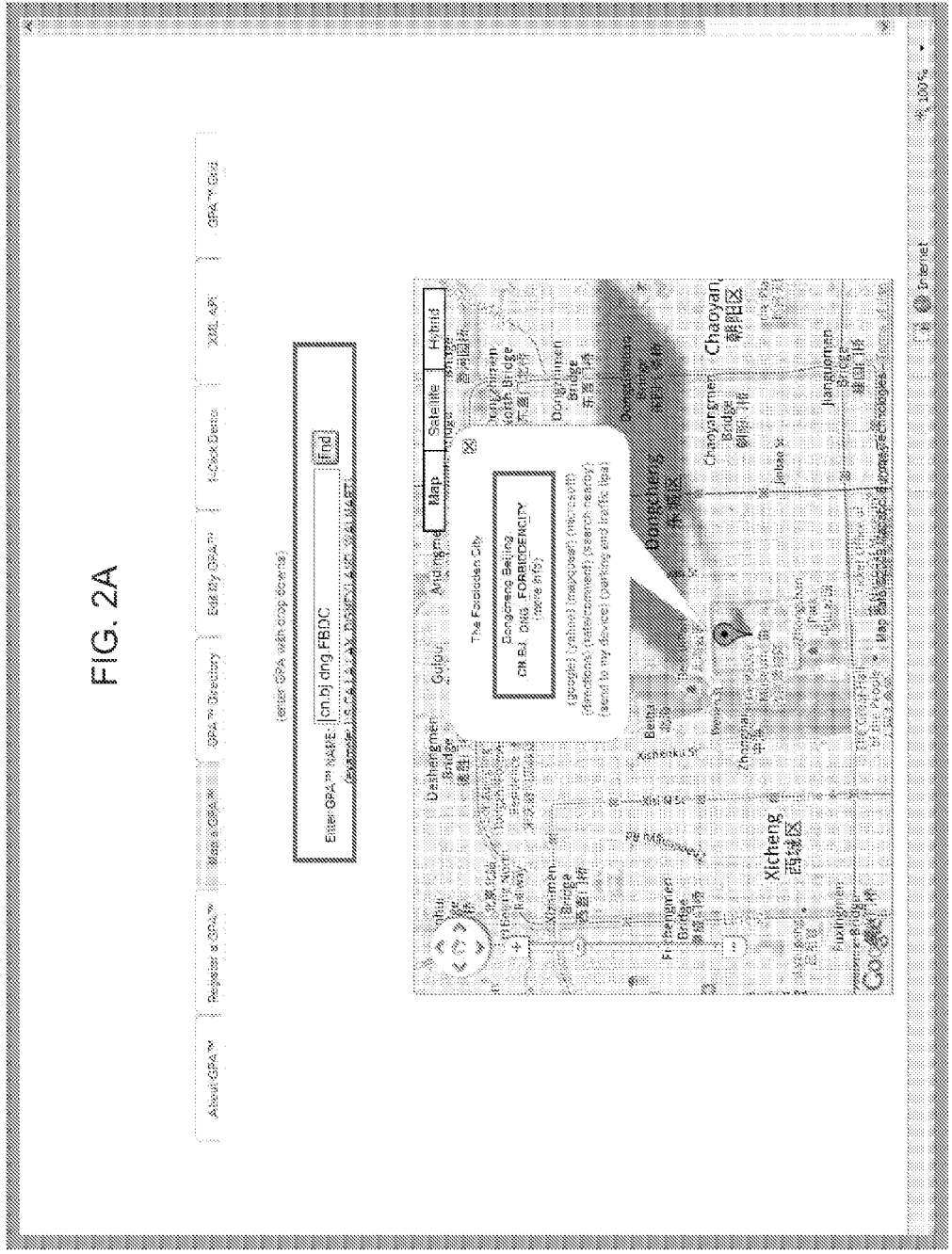
Figure 2C:
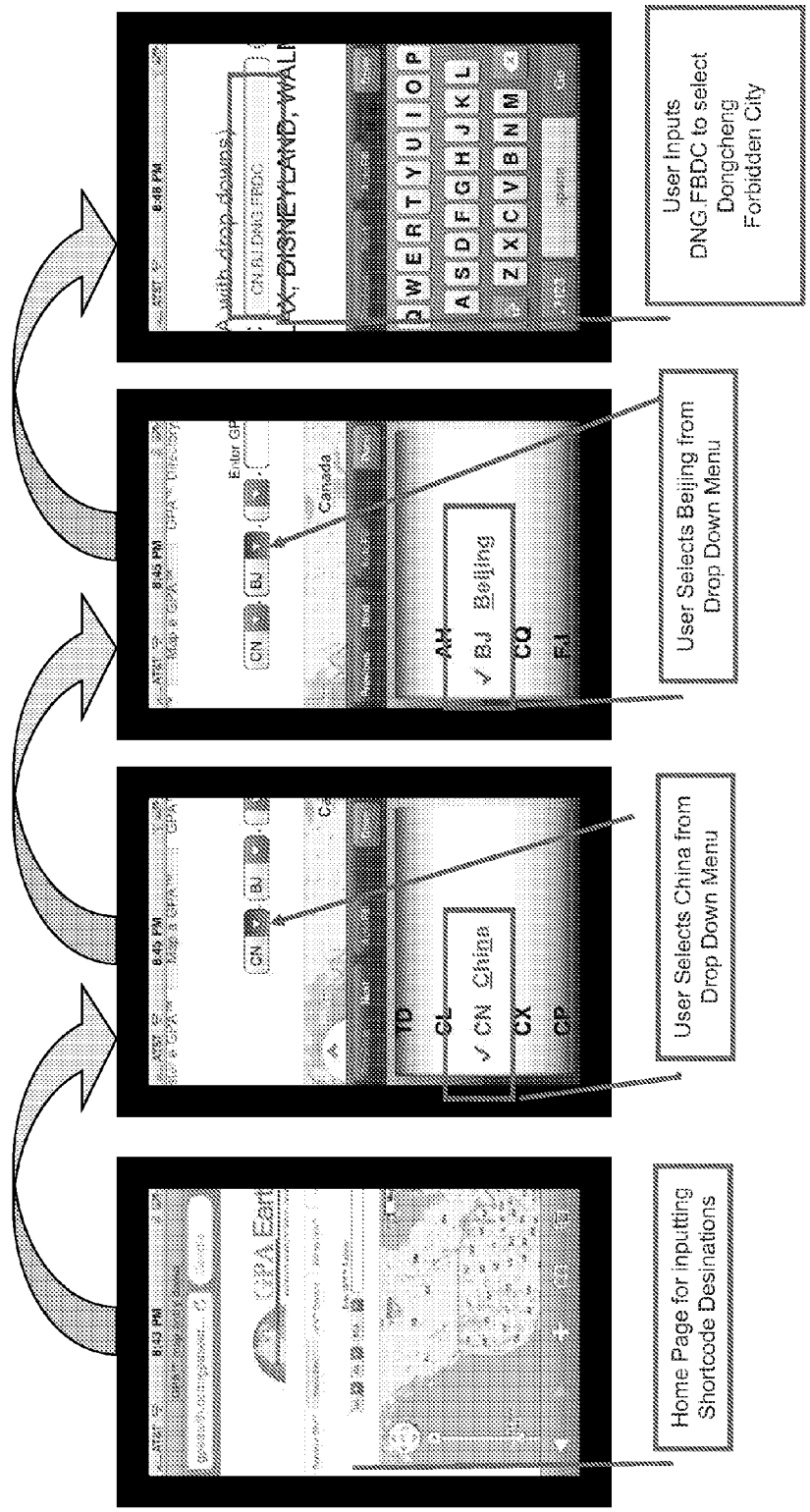
Figure 2D:
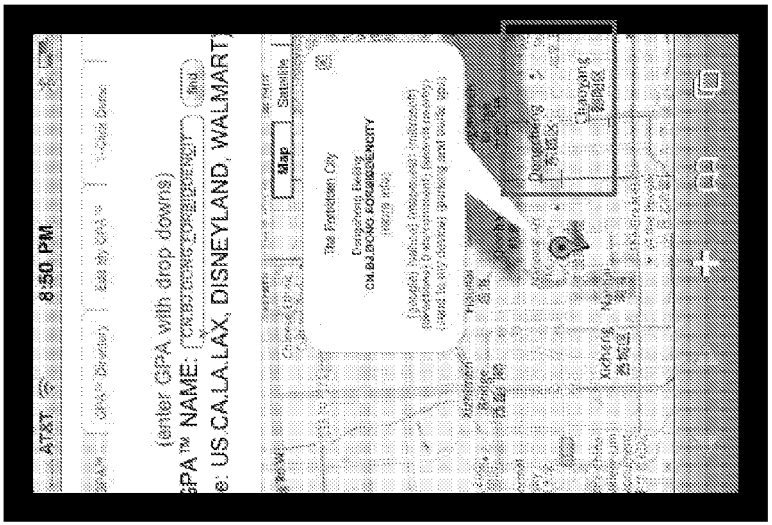
Figure 2D:
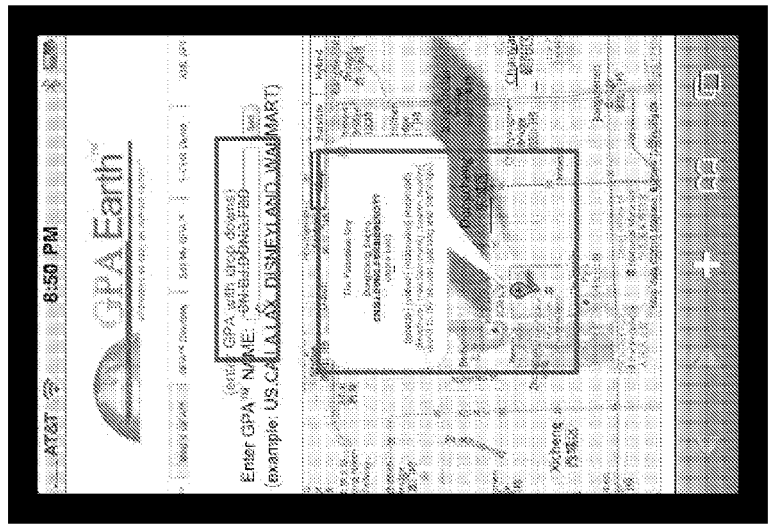

A person getting ready to take a walking tour of an area of Shanghai, China may look at one or more maps and see numerous ISCs for several features or attractions, all with rather long and unfamiliar names, and rather than inputting the full length of all of those names into their device to create a walking itinerary for the trip, the person may merely input the indicated Shortcodes imbedded in the associated full names of the maps to designate the desired locations. In these situations, the use of ISCs may reduce the number of required keystrokes by an order of magnitude. For example, in the area in Beijing, China indicated on FIGS. 2A-2D, the person may look at the map in FIG. 2B and then merely input an itinerary of "CN.BJ.FBDC, DNG, CHYN" into his or her phone to designate the areas/locations to visit, perhaps using the iPhone as a navigation tool.

Example 2

The importance of interoperability of ISCs, particularly those associated with the transition from paper maps to digital maps and digital navigation devices may be demonstrated by the use of ISCs for virtually every city and every POI on tourism maps for large areas (e.g., each of the states in the U.S.). States or other responsible parties may designate preferred Shortcodes for cities and other POIs, easily print ISCs on various paper and digital maps or otherwise ensure that various digital devices and services displayed such ISCs. Over time people who use those maps may begin to recall the Shortcodes for those cities, POIs, etc. on their own, perhaps without reference to the maps. People who are unfamiliar with the areas, or perhaps who do not speak the native language as their primary language and therefore find the names difficult to remember and communicate, may find ISCs Shortcodes substantially easier to communicate, remember, write down, input into a vehicle or personal navigation device, or otherwise use ISCs. Thus, dozens or hundreds of Shortcodes may be designated and effectively displayed and communicated on paper maps without any increase in map clutter or degradation of the map.

Example 3

It is possible that television, magazine, newspaper, billboard and even radio advertising (with associated visual displays) may utilize ISCs by displaying keywords, destinations, and/or other terms in the manner described and demonstrated herein, thereby helping the viewers of such messaging remember a short sequence of letters and numbers, which the user may use to quickly and unambiguously navigate to, obtain information about, or otherwise designate a product, brand, etc. It is possible that different ISCs may be used for the same associated full name of a product in different publications in order to track and monitor the origin and source of advertising giving rise to the use of such Shortcodes for the same full name. It is further possible that by promoting unique ISCs, advertisers and marketers may gain advantages because of the ease of using Shortcodes to designate locations, products, and services, and/or by reinforcing and building continued and repetitive awareness of Shortcodes by imbedding such Shortcodes through ISCs in virtually all of the displays and visual presentations of their products and brands.

Example 4

Publishing and receiving agents, plug-in, and other programs may be enabled to recognize and interpret Shortcodes and/or names with corresponding ISCs and Shortcodes and automatically display associated full names and/or ISCs, in part based on information and other factors determinable by the context of the user or usage associated with the publisher or receiver of the message including the ISC. For example, a user may type the name "Buckingham Palace" into a word processing program, text messaging, or email publishing program, and the system may automatically recognize that Buckingham Palace is an associated name for an ISC and therefore automatically input (or prompt for the user selection to input) the ISC (e.g., Buckingham Palace) or Shortcode (e.g., Palace) in lieu of the full associated name. Similarly, the system may automatically input the full, traditional street address for that specific location with the ISCs indicated therein. A receiving agent receiving any such message with a Shortcode or ISC may also automatically expand the Shortcode into a full address or associated name with the ISC indicated therein. In addition, the publishing agent may utilize user designated preferences or the context of the usage (e.g., the device being used, the known location or direction of travel of the user, time of day, past usage patterns of the user, or the nature of the information represented by the ISC) to abbreviate, and display the ISC or Shortcode, as appropriate, and the receiving agent may similarly utilize such preferences and context of the user of usage to better meet the needs of the end users. Both publishing and receiving agents and programs may also provide parsing and disambiguation capabilities based on a variety of databases, programs and systems affecting the use of ISCs, including systems that may provide ISC and Shortcode auto-complete and spell-checking functionalities based on specialized, customized, and hierarchically structured dictionaries or other features designed to accelerate the processing, interpretation, and disambiguation of ISCs or Shortcodes based on the context or other information derived from the user.

Example 5

The methods and manners of assigning ISCs for maximum efficacy may be automated through various rules designed to provide priority in the determination of Shortcodes that are compliant with the systems and methods herein by considering various factors that may be indicative of the expected volume or nature of the anticipated uses by taking into consideration various factors, including the size and population of cities, the frequency of city or street names within various political subdivisions or across other political subdivisions. For example, Main St. is a very common street name in the U.S. and thus might be assigned a standard ISC (e.g., MN) first across all jurisdictions in order to ensure the availability of that Shortcode across all jurisdictions and to ensure that the ISC for a very common name (e.g., Main) was also available across all jurisdictions, thereby facilitating the use of the ISC across multiple jurisdictions. This may be accomplished by empirical data collection on the number of states that have identical cities (e.g., Springfield) or the cities which have identical street names and determining through algorithms the optimal Shortcode assignment to maximize the effectiveness of the system.

Example 6

It is possible that ISCs may be designed and used to create an alternative form of identification and branding, governed by agreements and limitations on the use by operators of search and communications systems and devices desiring to use ISCs whereby the various parties associated with names and ISCs have greater protection against confusing or infringing uses of similar ISCs, thereby maximizing or increasing the intangible value for such associated names and ISCs than they would otherwise have without such codes. For example, in the future, companies and individuals may create brand and product names that are particularly conducive to the use of clever, memorable, or otherwise beneficial ISCs and Shortcodes. General search engine companies, like Google, or more narrowly focused search or information services may be required to agree upon certain standards and protocols designed to facilitate the use and efficacy of ISC enabled searches over non-ISC enabled searches (e.g., the prohibition of utilizing any ISC to trigger any search or navigation to anything other than the specific destination or name associated with such ISC). Another such provision may require such search engines to provide specific or specialized traffic measurement, metrics and reporting on the presentation or use of ISCs and/or the associated Shortcodes by their systems and services.

Example 7

The use of ISCs may be particularly valuable in connection with lists and tables where space and brevity is important, especially where there are repetitive uses of similar names. Consider the following table displayed on a mobile phone with a very small and narrow screen size that provides a list of three relevant locations of Sammy's Camera and Video and their street addresses to a person unfamiliar with the area, or perhaps even the English language:

| With Imbedded Shortcodes Include in Full Address for Each Entry | With Imbedded Shortcodes Displayed Alone After the First Entry |
|---|---|
| 1) Sammy's Camera and Video 1234 North Hamilton Drive, Rancho Santa Fe, California United States 92748 | 1) Sammy's Camera and Video 1234 North Hamilton Drive Rancho Santa Fe, California United States 92748 |
| 2) Sammy's Camera and Video 4267 North Hamilton Drive, Rancho Santa Fe, California United States 92758 | 2) Sammys.4267NHD.RSF.CA.US 3) Sammys.4231MN.RSF.CA.US 4) Sammys.1821AVARTS.CC.CA.US 5) Sammys.7454SMB.CC.CA.US |
| 3) Sammy's Camera and Video 4231 Main St., Rancho Santa Fe, California United States 92718 | |
| 4) Sammy's Camera and Video 1821 Avenue of the Arts, Century City, California, United States 92648 | |
| 5) Sammy's Camera and Video 7454 Santa Monica Blvd. Century City, California, United States 92615 | |

The use of Shortcodes following the presentation of ISCs may require less space, thereby enabling the listing of more locations and information to be communicated in any given area, and the display of the ISCs may make it easier for the user to associate subsequent Shortcodes with the associated full name of the store, street, city and state. In this case, the repetitive nature of the Shortcode may make it easy for the user to focus on the differences in the Shortcodes that are relevant, while at the same time being able to reference the ISC if necessary.

Example 8

ISCs may be assigned, used, and displayed alternatively and selectively to the public or more narrowly to specific users and user groups, thereby allowing different ISCs to be created and used by the general public, governmental employees, private and commercial groups, and even individuals who designate their own ISCs for their own use within closed systems that they have designated. The display and use of any such ISCs may be limited to users who have provided a password or who are otherwise authorized or intended to have access to see and read and/or use ISCs, thereby providing opportunities for enhancing privacy, anonymity, and/or ambiguity to those who are unauthorized to use any such ISCs.

Example 9

ISCs may be used at all levels of any abbreviation or shortcode schema, including extensions and abbreviations for virtual locations, products, generic terms, descriptors and similar references to components or further segmentations of names, products, locations, etc., including alternative websites and URL addressing structures and solutions. For example, individuals and entities may establish their own ISCs for various physical or virtual (e.g., IP addresses of various Internet devices) locations within their business, factory, property, plant, office or home, thereby facilitating the quick referencing or designation of such physical or digital locations with Shortcodes taught by the use of ISCs.

Example 10

ISCs and Shortcodes may be used on any physical or electronic/digital display to provide an alternative or supplement to hyperlinks. For example, in digital maps where it is difficult to provide Internet hyperlinks or other "live" links to all of the various cities, states, POIs, and other locations, names, and information displayed on the maps, ISC and Shortcodes may be used to provide a very efficient way for the user to input into an alternative selection or input box a few characters shown on the map from an ISC and automatically select, input, or find information about that particular location. This is particularly helpful on mobile phones, PNDs, and other small portable devices, where the resolution for selection of a particular label or tag by pointing at the tag on a touch screen may not be practical due to screen size or other limitations. It may also be helpful where the ISC is originally seen on a printed paper map and subsequently used to identify the particular item of interest on a mobile phone or other digital device. For example, while viewing an image such as indicated on FIG. 2B, a user may merely input DNG into the More Info selection box to find more information about, link to, select, or otherwise designate the district of Dongchen, or DNGBR to select information about Dongsishitiao Bridge. The methods, systems, and programs using such ISCs may advantageously interpret such Imbedded Shortcodes solely with reference to the area or image displayed on the map, thereby minimizing the characters required to uniquely select or designate a location with reference to such displayed image. Yet such ISCs may work across all other systems when appended to other, higher level identifiers to designate the image or area or other context of the display or use of the ISC. This alternative method and system may require less resources and complexities than hyperlinks and other methods of selecting images, locations, names, etc., particularly in the context of maps and other images, which may contain numerous locations.

Example 11

ISCs may be designated for micro-locations at virtually any scale or level of precision. For example, a museum and its visitors may utilize ISCs in printed and digital materials, brochures, pamphlets, guidebooks, self-guided tours, etc. to designate various tours, locations, exhibits, sections of exhibits, or even items in exhibits and displays. These ISCs may be used to designate Shortcodes that may be input into a mobile phone or other electronic device, either as a sole designator or perhaps as a series of designators used to create a chronology or itinerary for a visit to the museum, to create notes, logs, or journals of the items seen, or as abbreviated designators to look up additional information about one or more specific items in the exhibit. For example, a placard next to the Paul Rondoley painting "September Morning Sunrise" at the Orlando Museum of Modern Art may easily include an ISC by displaying: September Morning Sunrise by Paul Rondoley so that a user could merely input SMS.PR into an electronic device (where the "Orlando Museum of Modern Art" had already been designated) to find additional information about this specific painting or refer someone else to this information or the location of the painting, e.g., by sending them an email with the Shortcode OMMA.SMS.PR. The recipient of such communication may use this Shortcode to navigate to or obtain more information about this painting. The receiving agent displaying the message may automatically display the entire full name and the ISC on the device as "September Morning Sunrise by Paul Rondoley at the Orlando Museum of Modern Art".

Example 12

Figure 3A:
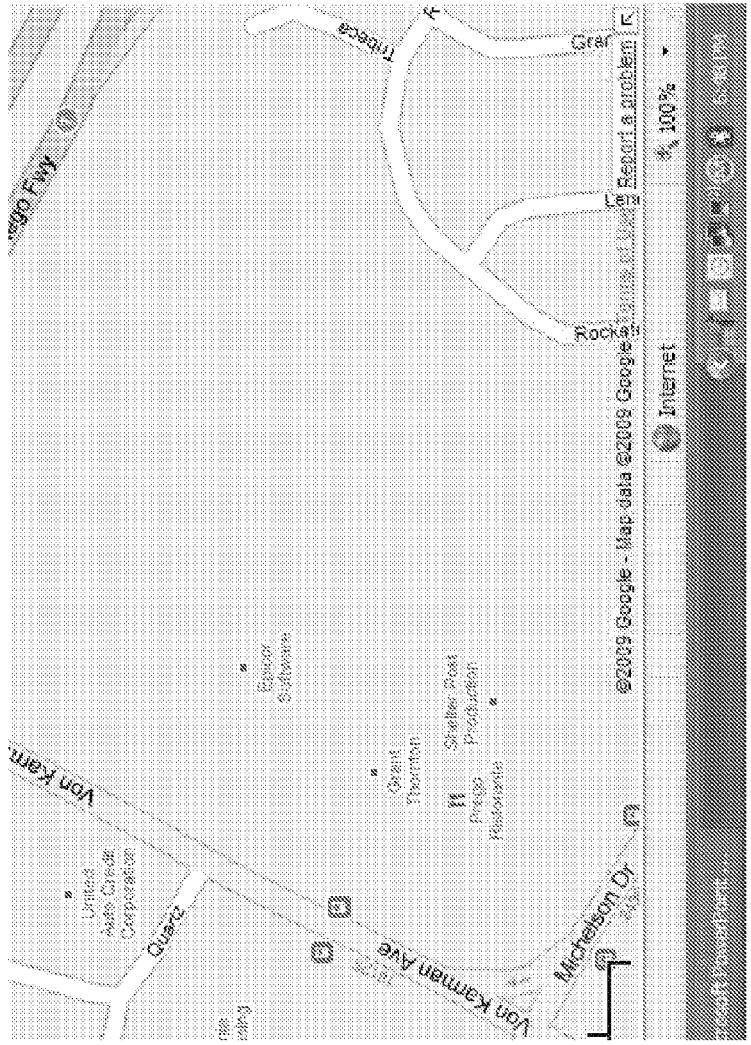
Figure 3B:
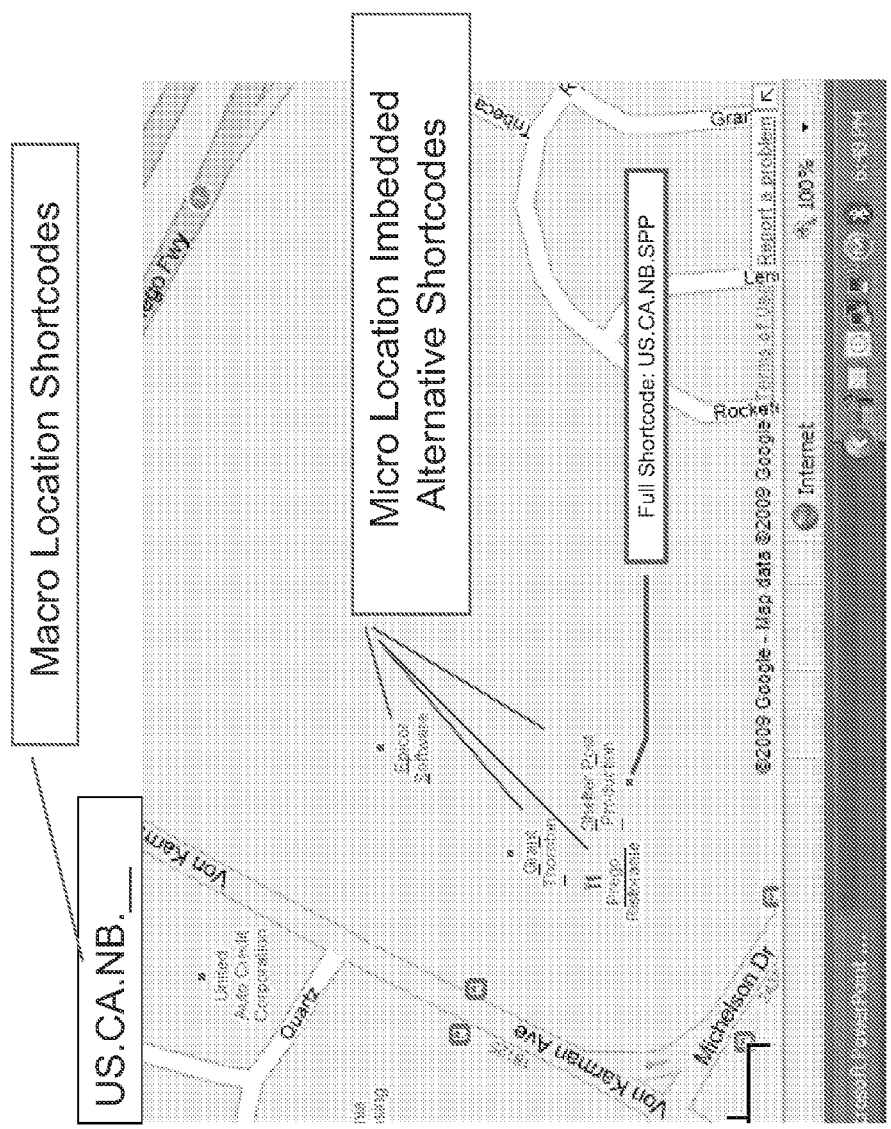
Figure 4A:
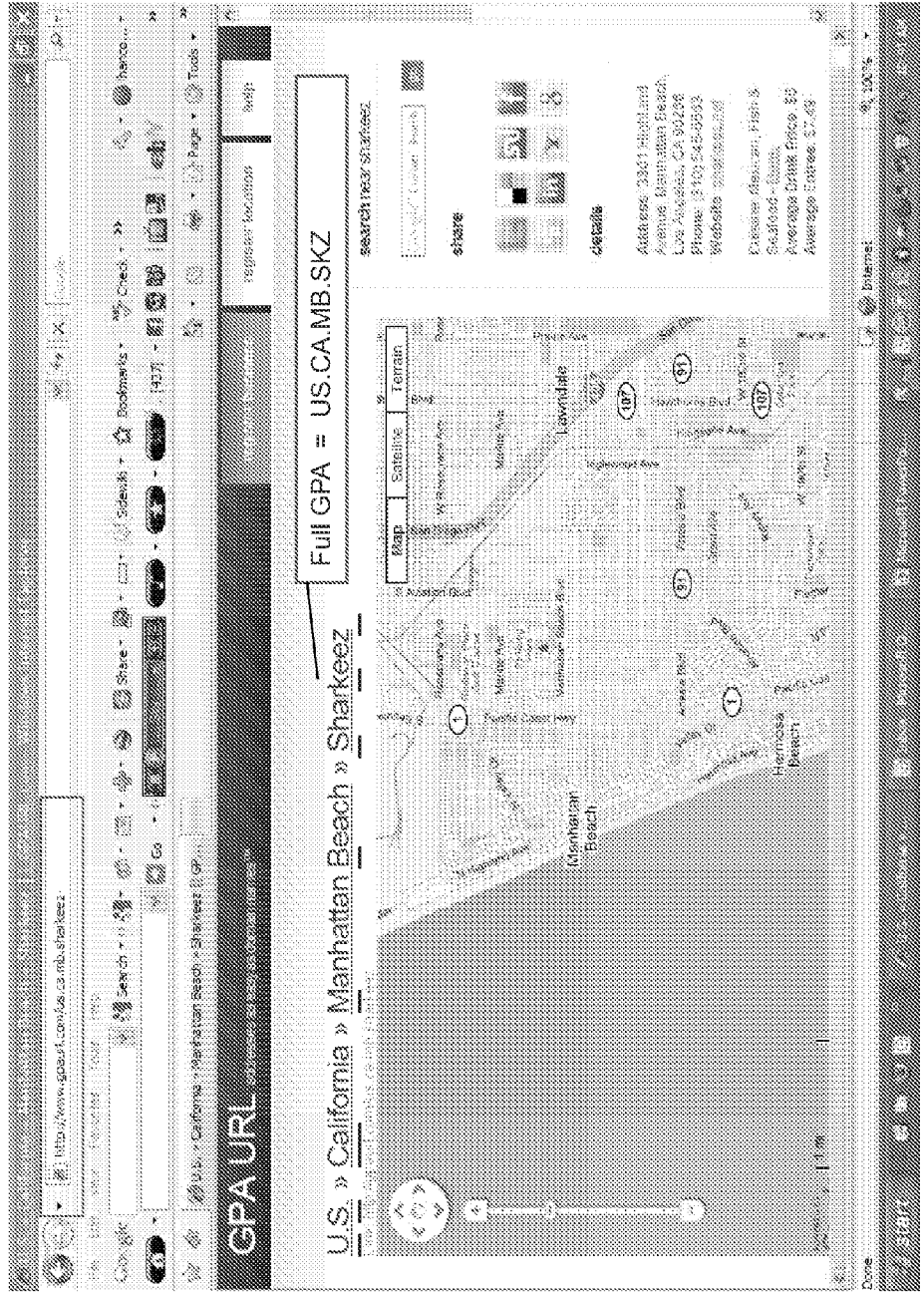
FIGS. 4A and 4B are exemplary images of digital maps that may be presented on web pages using the systems and methods herein, showing the display of an ISC for a specific commercial establishment in Manhattan Beach, Calif.
Figure 4B:
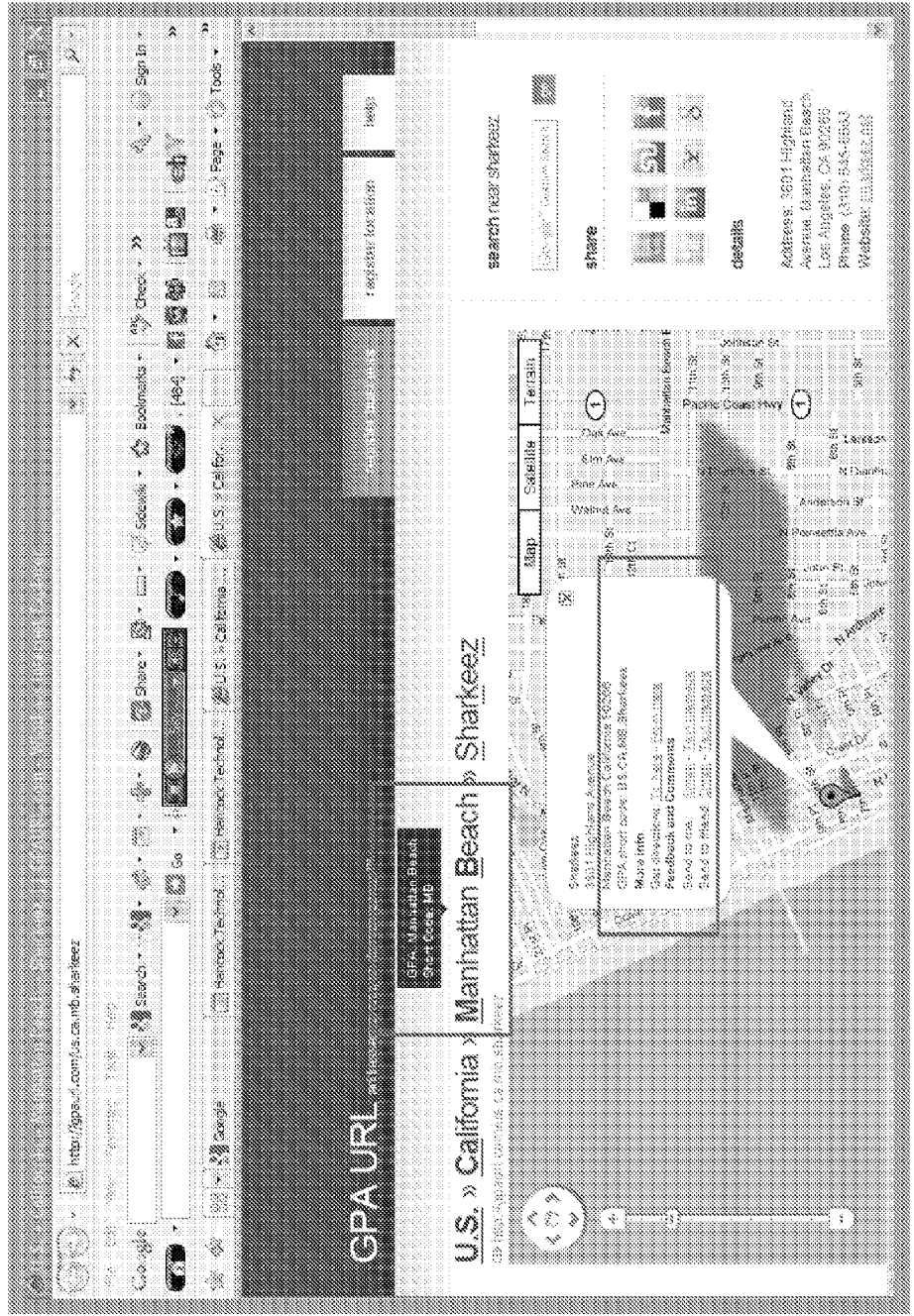
Figure 5B:
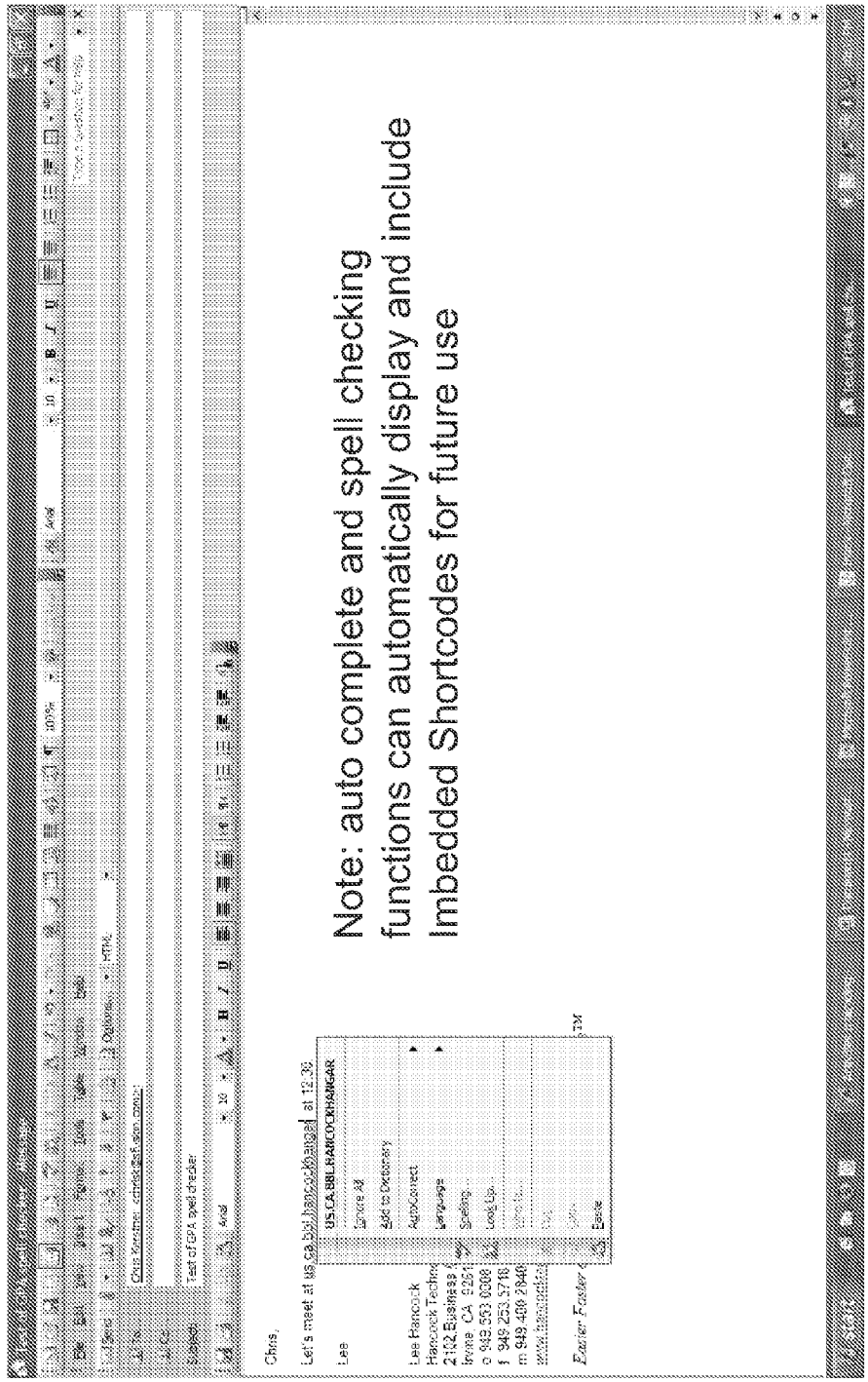
Figure 5C:
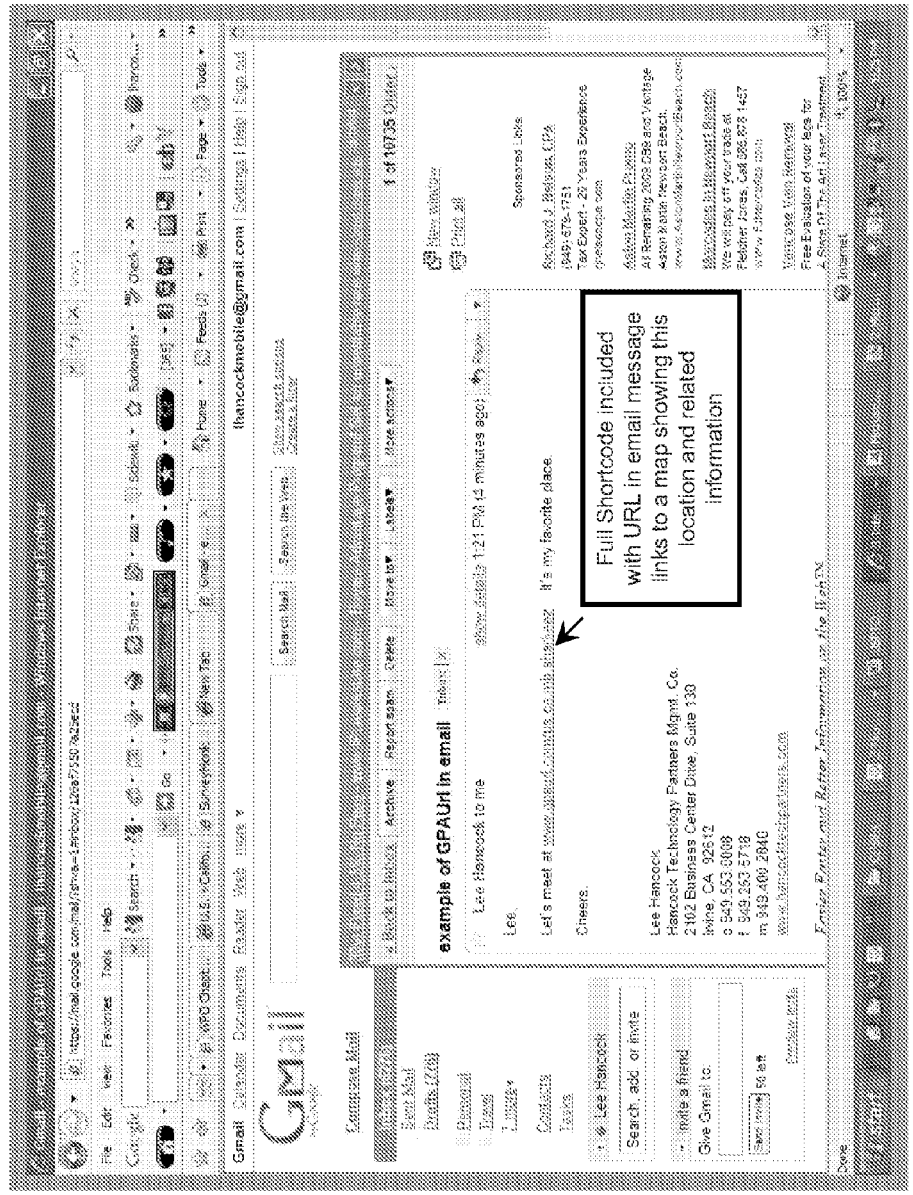
Figure 6A:
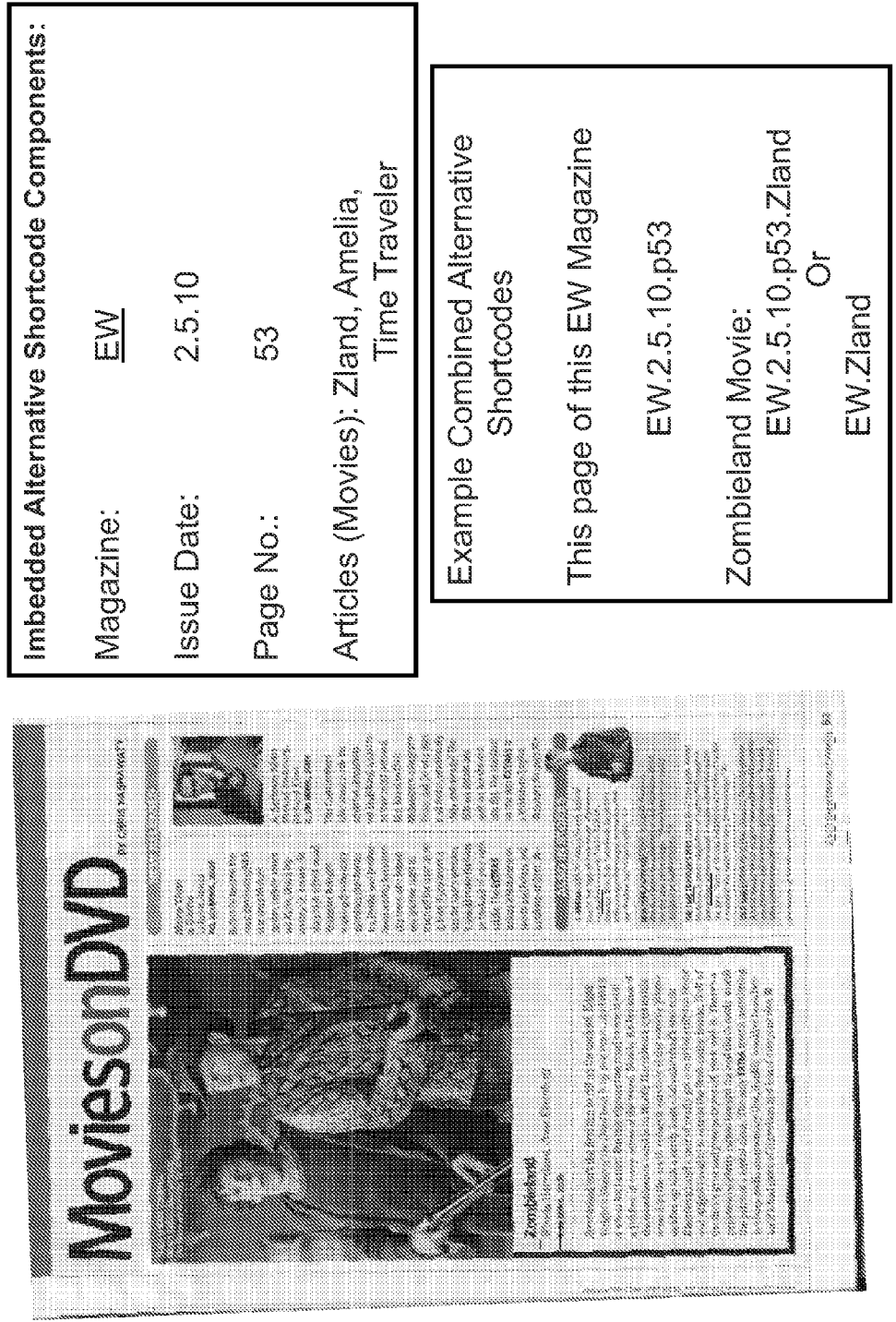
FIGS. 6A-6C are images of illustrative publications and printed materials illustrating the use of ISCs in advertisements, coupons, and articles included in printed publications.
Figure 6B:
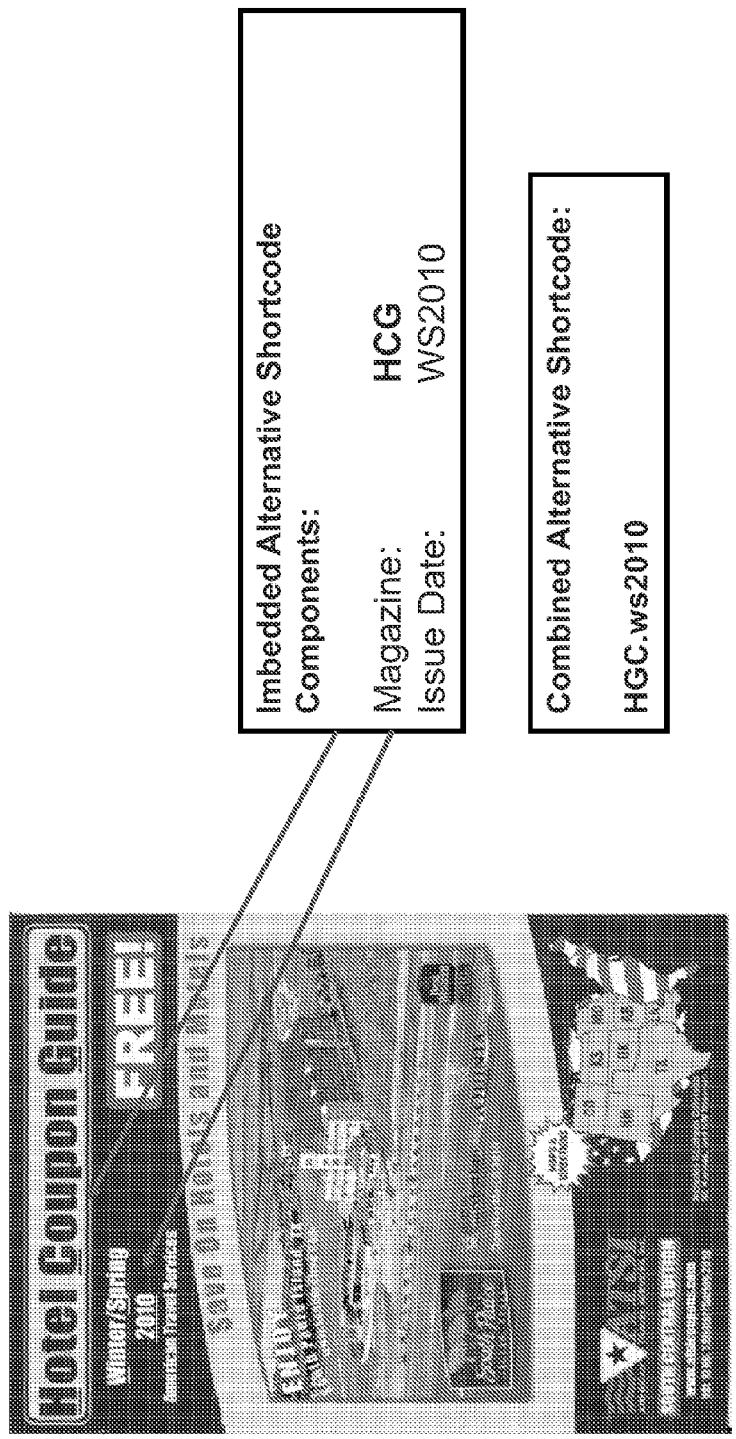
Figure 6C:
Figure 7A:
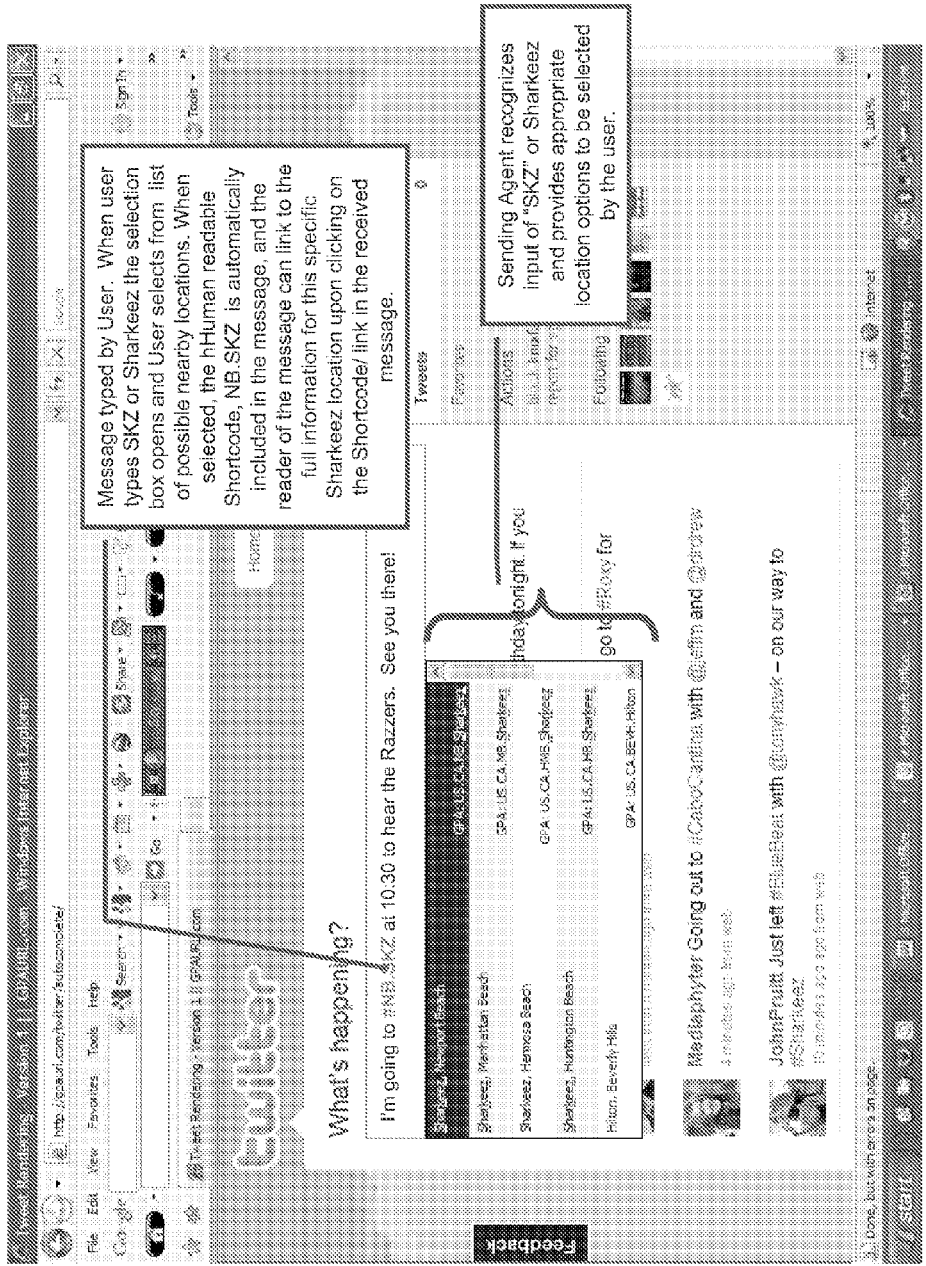
FIGS. 7A and 7B are sample screen shots of an email/text message communication program, in this case Twitter, including features of the systems and methods herein. These screenshots illustrate the possible use of ISCs in references to specific locations and the ability of ISC enabled programs to assist users in typing and selecting ISCs. The sending agent (FIG. 7A) may recognize the beginning of an ISC and auto-complete and/or spell check the name reference, and/or if ambiguous, present a series of locations and associated ISCs relevant to the user for the user to select the desired location, and the Shortcode or ISC may be automatically imbedded in the message sent by the user. Similarly, the receiving agent (FIG. 7B) may display the ISC and display to the receiver a variety of information regarding that location. Both the sending agent and the receiving agent may be connected to a server and database that is kept current on a real-time basis in order to ensure that the ISCs and related information are current.
Figure 7B:
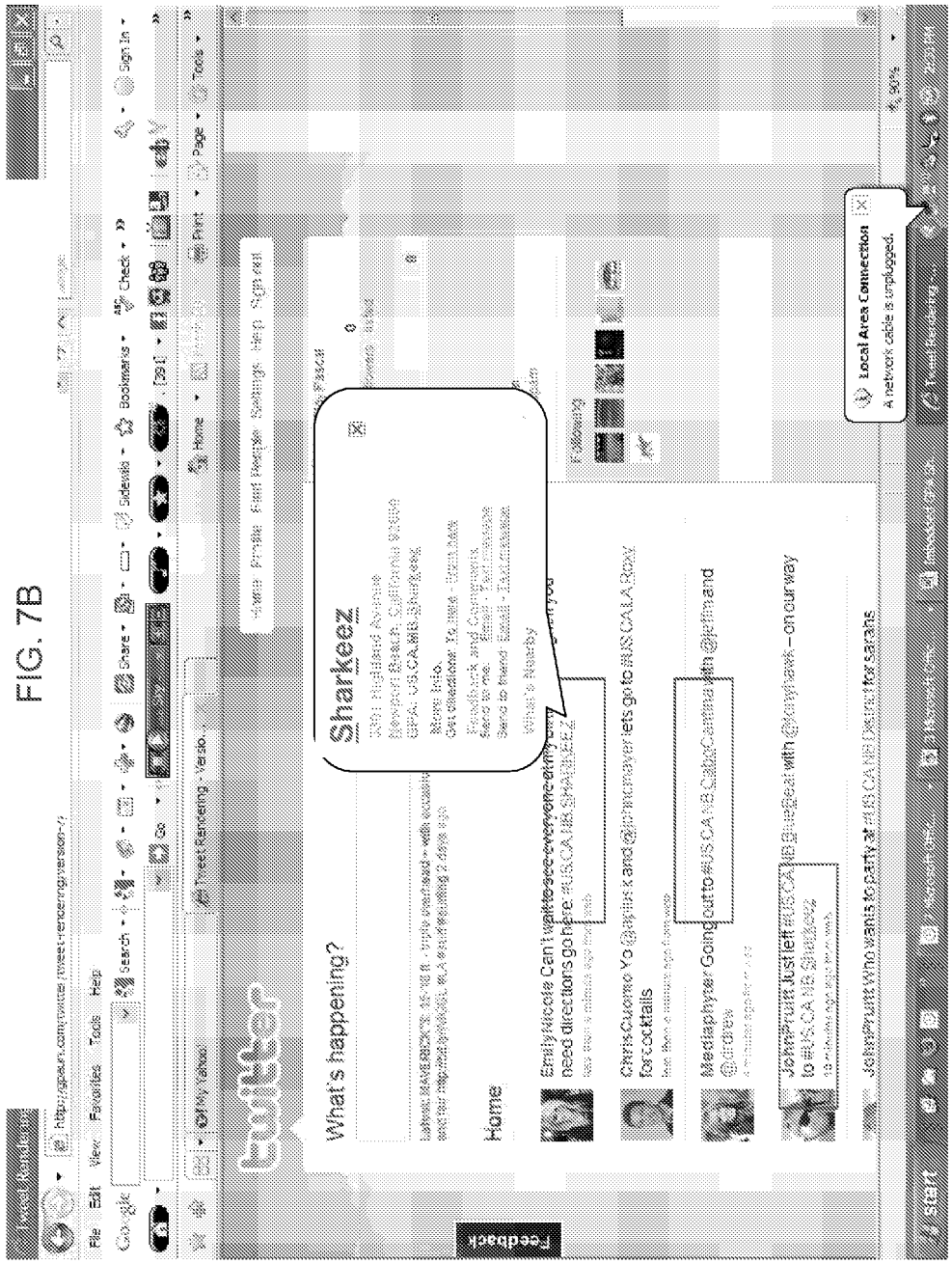
Figure 8A:
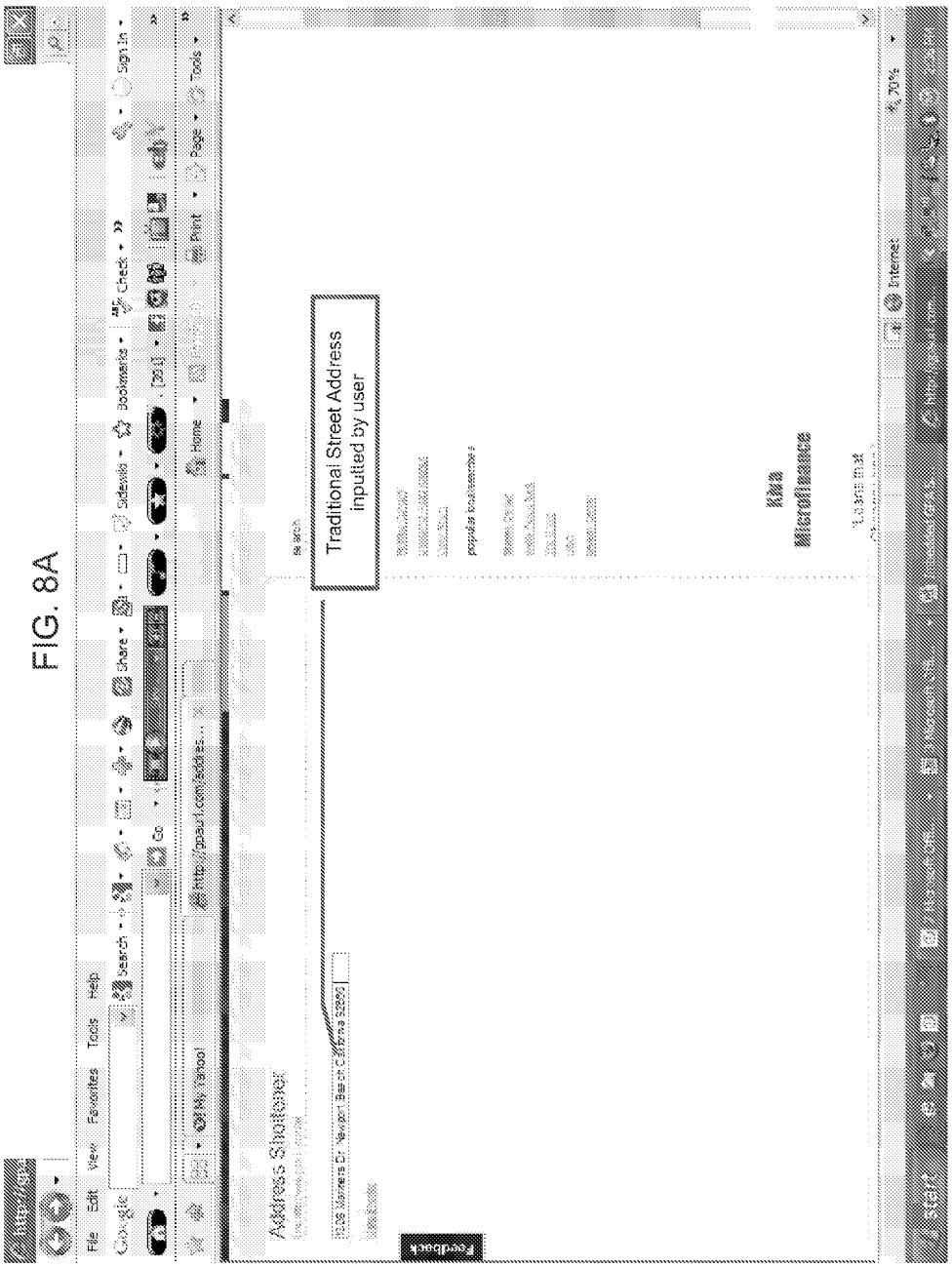
FIGS. 8A and 8B are screenshots of a sample web-enabled physical address shortener that automatically converts full, traditional street addresses in any format for any location in the world into shorter addresses and URL strings and demonstrates how Shortcodes and ISCs may be used in full addresses to imbed standardized abbreviated addresses or Shortcodes into the full addresses and how the Shortcodes may also be included in the shortened URL addresses in a manner that is shorter, computer readable, and human readable and friendly.
Figure 8B:
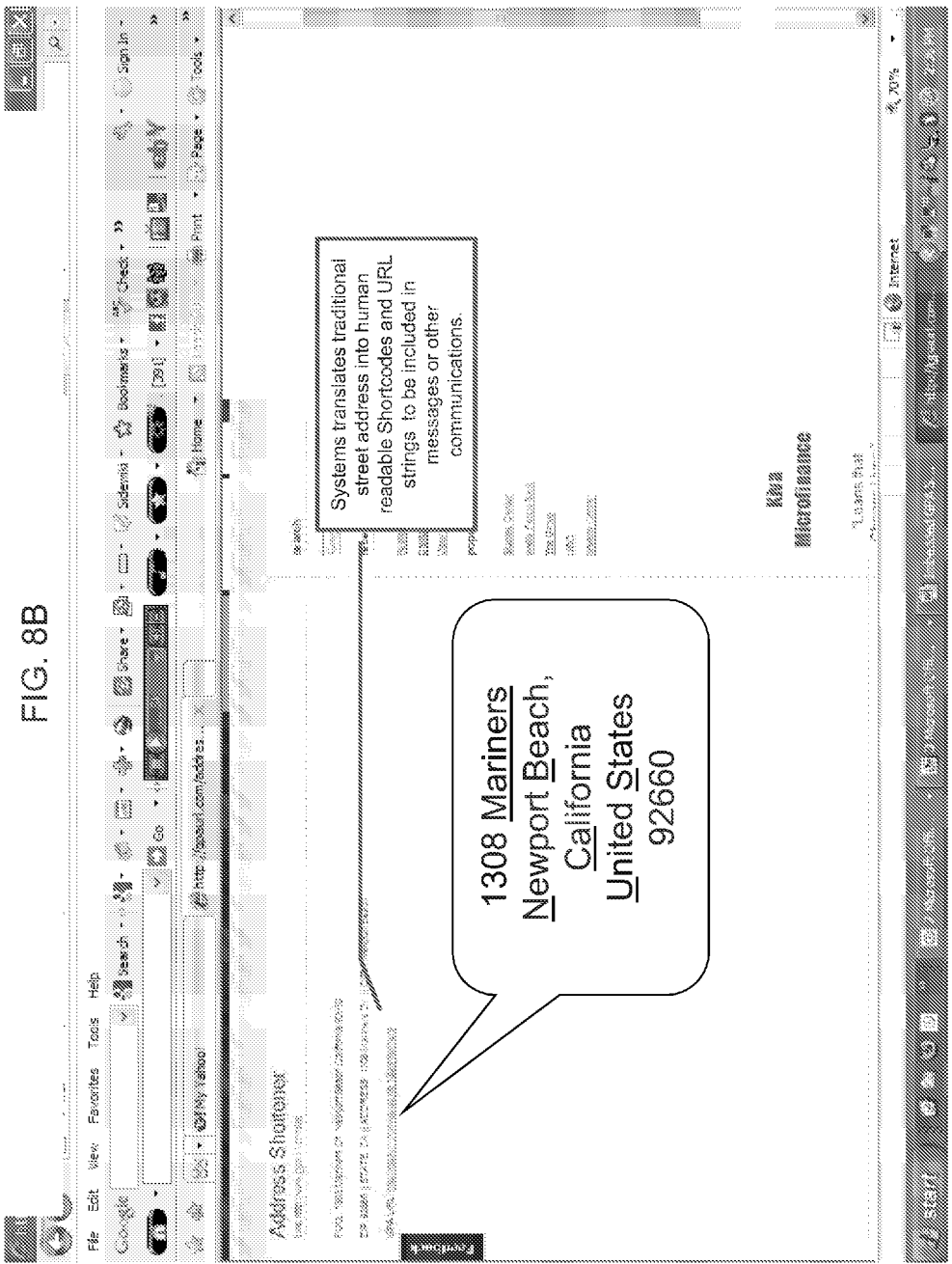

ISCs may be coordinated with other methods of displaying Alternative Shortcodes in ways that facilitate combining various Shortcodes, as appropriate. For example, FIGS. 3C and 4A illustrate maps including areas in Newport Beach and Manhattan Beach, Calif. and indicate alternative uses of full names with ISCs for various political jurisdictions and locations (FIG. 4A) and Shortcodes for various political jurisdictions and locations, with full names and ISC provided on demand to the user (FIG. 3C). This may be accomplished in ways that facilitate the combination of ISCs for bigger areas (countries, states, cities) displayed once on the page with more specific ISCs for other locations shown on the page (e.g., specific streets, houses, businesses, POIs or other locations).

Example 13

ISCs may be used in connection with Internet navigation and domain names through the use of both ISCs and their counterpart Shortcodes in URL addresses, extensions, and search and other navigation strings. For example, the URL "China.Beijing.Dongcheng.mapit.com" may be automatically or alternatively be displayed or presented by a browser as on the page (or pop-up display) as "China.Beijing. Dongcheng.mapit.com" to indicate to a user that in the future inputting "CN.BJ.DNG.mapit.com" may be used as a more abbreviated URL to access the same map, page, or information. Alternatively, the URL "www.mapit.com/China. Beijing.Dongcheng" may be automatically or alternatively displayed or presented by the browser to the user as map-it.com/China.Beijing.Dongcheng to indicate to a user that in the future inputting the URL www.mapit.com/cn.bj.dng may be used as a more abbreviated URL to access the same page.

Example 14

In the context of location-based services where multiple Shortcodes may be used by users to represent various components of traditional physical addresses (e.g., countries, states, provinces, cities, neighborhoods, streets, or location names (e.g., McDonalds), etc., sending and receiving agents or programs may parse and disambiguate alternative methods of input in both the sending and receiving programs. For example, a user inputting just the Shortcode for a location name, e.g., MCD or McDonalds, may be presented with ISCs or Shortcodes for relevant alternative cities, locations, etc. for such location names in order for the user to select the desired location. The system or method may then append the appropriate names, ISCs, or Shortcodes (e.g., CN.BJ.DNG.MCD). Similarly, the system or method may parse inputs from users of ISCs or Shortcodes in any order, as appropriate.

Example 15

One of the aspects of establishing and creating Imbedded Shortcode systems and methods, as described herein, may be providing processes, systems, and/or methods designed to solicit user feedback and comments regarding the selection of Shortcodes imbedded in ISCs and monitor the use of such ISCs to determine their efficacy and to track other measures regarding their use for commercial and other purposes. For example, programs, websites, and communications may be established that solicit user suggestions, feedback, comments, even polling regarding the best Shortcodes to be assigned and included in ISCs for various locations, neighborhoods, streets, categories of information, or other communications systems based on local experience and colloquial use throughout the world.

Example 16

Another aspects of establishing and creating Imbedded Shortcode systems and methods, as described herein, may be providing processes, systems, and methods designed to track the use of ISCs and/or their corresponding Shortcodes to determine information and metrics related to the use of such ISCs as well as information related to the object related to the underlying associated names. For example, if a retail location's ISC usage drops dramatically or ceases being used it might evidence the closing of or other major change related to that retail location.

Example 17

There may be situations where the size of the display on digital devices (e.g., PNDs, Mobile Phones, etc.) or of printed maps or other materials (e.g., business cards, pocket size printed materials) are so limited relative to the number of locations or names desired to be displayed that only Shortcodes are used and displayed. Those Shortcodes may nevertheless be used in the same media or other media to input or select a location or other name, and the methods and systems incorporated by the other media may automatically interpret the Shortcode, display the Imbedded Shortcode along with the associated full name, and significantly facilitate the efficacy and use of the size constrained display and system, thereby allowing substantially more information, locations, etc. to be effectively displayed visually on the size-limited display and system than may be otherwise displayed. This is beneficial whether the input of the Shortcode is on another interoperable device or into an input box or more information box on the same devices, e.g., as described in example 10 above and illustrated in FIG. 2B.

Example 18

Currently computer software operating systems, programs, and applications are unable to store characters with the imbedded coding necessary to make the use of ISCs easy and interoperable across various systems. For example, it is not possible to copy the ISC "Rancho Santa Fe" as it appears in a word document, database, or spreadsheet directly into a search box written in HTML, the language used for most Internet pages and Internet browsers, etc. and for the resulting ISC to be displayed automatically in the form in which it was copied—with the "R", "S", and "F" underlined or bolded or otherwise marked. Further, the word "test" normally requires 4 characters of space to store in a simple database. However, the same word "test" with an ISC for the Shortcode TS (TEST) may take additional characters of space to store: the first four (4) characters of space to store the word itself and an additional two (2) characters of space to store the position of the underlined characters, or "1,3", therefore requiring additional storage and processes to use ISCs. Accordingly, the effective implementation of the ISC system described herein may likely require creation of additional codes, processes, and data fields populated with the additional formatting data necessary to implement ISCs. In the context of storing and processing millions of ISCs, this may generate significant additional demands on the database servers and processing. The creation of an additional character set including flags or alternative characters (e.g., "A" or "a") that are included in the ISC may enable the much more efficient use of ISCs and other similar functionality across all computer and electronic systems. This may be accomplished through plug-ins, alternative coding and database or other methods, or possibly through the addition of ISC marked characters into subsequent versions of computer programming characters sets such as ASCII and UTF-8.

Example 19

ISCs and Shortcodes may be used in search strings in order to quickly and efficiently designate information relevant to a search, and ISCs may be used to promote the use of such abbreviated searching techniques. In the context of an LBS Search, a user may search for "hotels near Prego Ristorante in Newport Beach California USA" and the search results may display the search results in way that indicate the location of the search by using ISCs (e.g., "hotels near United States-.California.Newport Beach.Prego Ristorante") or alternatively just the corresponding Shortcode for the address (e.g., "hotels near US.CA.NB.PREGO"). Thereafter, after learning of the Shortcode for the various geographic components of the location of the search, the users may effect the same search by merely entering the Shortcode and the desired search term into the search box. For example, a user inputting US.CA.NB.PREGO.hotels into a mobile phone may generate a search for hotels near the location of PREGO, or by utilizing context as described earlier the user may only need to input the Shortcode PREGO.hotels, or perhaps even inputting something as short as PREGO.RES to designate a search for restaurants near PREGO if the user had been previously made aware of the Shortcode RES for Restaurant through the use of an ISC "Restaurant").

Figure 9:
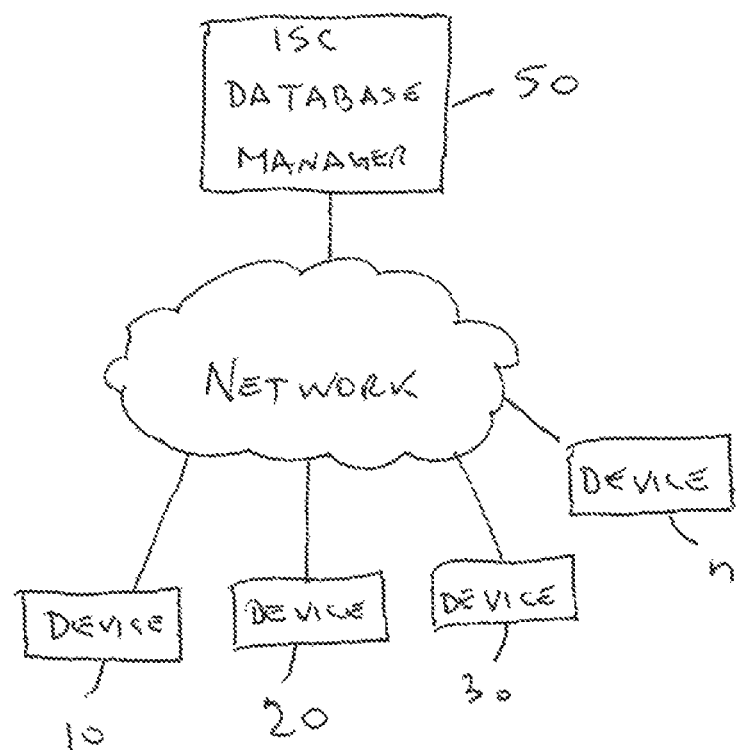
FIG. 9 is a schematic drawing showing a network architecture providing an exemplary embodiment of a system for registering and using ISCs according to the systems and methods herein.

It will be appreciated that the systems and methods herein may be performed by one or more computers or other electronic devices communicating via a network. For example, FIG. 9 shows an exemplary embodiment of a system 8 for establishing, searching, and/or otherwise using ISCs, according to the systems and methods herein. As shown, the system 8 includes various devices connected to a network 40, such as user devices 10, 20, 30, *n*, and an ISC database manager 50.

In one embodiment, the network 40 may be a wide area network ("WAN"), a local area network ("LAN"), an intranet, a wireless network, a short messaging service ("SMS"), or a telephony network. For example, the network 40 may incorporate several different types of networks including a WAN, a LAN, and/or a wireless network; one such network including multiple different types of networks is the Internet.

Each of the user devices 10-*n* is a computing device, such as a desktop computer, a laptop computer, a mobile or cellular telephone, a personal digital assistant (e.g., a Palm Pilot device, Blackberry device, and the like), an interactive television, a vehicle or portable navigation system, a kiosk, a lobby or elevator monitor, or other electronic device, capable of communicating via the network 40. Generally, the user devices 10-*n* may include one or more processors, memory and/or storage devices, communication interfaces, and/or user interfaces, e.g., a display, keyboard, mouse, and the like (all not shown). Users of the user devices 10-*n* may interact with the ISC database, e.g., by inputting Shortcodes or other requests that may result in the inclusion of ISCs in the information provided or information related to items of interest associated with the Shortcodes, as described elsewhere herein.

As shown further in FIG. 1, the ISC database manager 50 may include one or more computer systems, e.g., servers, communicating with one or more databases, e.g., including one or more processors, memory and/or storage devices, and communication interfaces for communicating via the network 40, e.g., with users 10-*n* and/or other parties involved in the methods performed by the system 8. The ISC database manager 50 may include one or more hardware-based components and/or software-based modules for performing the various functions related to the methods performed, as described elsewhere herein. Although only one ISC database manager 50 is shown in FIG. 9, it will be appreciated that multiple database managers (not shown) may be provided. The hardware and/or other components of the ISC database manager 50 and/or other components of the system may be similar to those disclosed in U.S. Pat. No. 5,839,088, and U.S. Publications Nos. 2005/0283503 and 2007/0244872, the entire disclosures of which are expressly incorporated by reference elsewhere herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:
1. A method for accessing content related to a location of interest, comprising:
observing on a first display a map including a full name identifying a location on the map, the full name defined by a first set of characters "X" and including an imbedded Shortcode defined by a second set of characters "Y" selected from the first set of characters "X" of the full name that are visually distinguished from remaining characters of the first set of characters "X" of the full name, with "Y" being less than all of the first set of characters "X" of the full name and the remaining characters defining a third set of characters "Z," wherein "X" equals the sum of "Y" and "Z," and wherein the second set of characters "Y" of the full name are visually distinguished from the remaining letters of the full name by at least one of underlining, bolding, enlarging, changing the font, and changing the color of the second set of characters "Y" in the presentation of the full name relative to the third set of characters "Z";
inputting the first set of characters "Y" defined by the imbedded Shortcode into an interface of an electronic device; and
observing on an electronic device display different than the first display additional information regarding the location of interest.
2. The method of claim 1, wherein the map includes a plurality of full names defined by a first set of characters "X," each full name including an imbedded Shortcode, and wherein each imbedded Shortcode on the map is different than the other imbedded Shortcodes.
3. The method of claim 1, wherein the location is a destination, and wherein the information received is at least one of directions to and information about the destination.
4. The method of claim 3, wherein the information received is a hyperlink to a website providing information about the destination.
5. The method of claim 1, wherein the first display is a static display.
6. The method of claim 5, wherein the first display is one of a paper map and a map on a billboard.
7. The method of claim 1, wherein the electronic device containing the electronic device display is a portable device including a wireless interface for transmitting the letters defined by the imbedded Shortcode to a remote location, and wherein observing the additional information comprises receiving the additional information from a remote location, and presenting the additional information on the electronic device display.

8. The method of claim 1, wherein the first set of characters "Y" is input into a device remote from the electronic device.

9. The method of claim 1, wherein the first set of characters "Y" is input into a device remote from the first display.

10. A method for accessing content related to an item of interest, comprising:
　　observing on a first electronic display an image including a full name identifying an item, the full name defined by a first set of characters "X" and including an imbedded Shortcode defined by a second set of characters "Y" selected from the first set of characters "X" of the full name that are visually distinguished from remaining characters of the first set of characters "X" of the full name, with "Y" being less than all of the first set of characters "X" of the full name and the remaining characters defining a third set of characters "Z," wherein "X" equals the sum of "Y" and "Z," and wherein the second set of characters "Y" of the full name are visually distinguished from the remaining letters of the full name by at least one of underlining, bolding, enlarging, changing the font, and changing the color of the second set of characters "Y" in the presentation of the full name relative to the third set of characters "Z";
　　inputting the first set of characters "Y" defined by the imbedded Shortcode into an interface of a portable electronic device; and
　　presenting on a portable electronic device display different than the first display additional information regarding the item of interest.

11. The method of claim 10, wherein the first set of characters "Y" is input into a first portable electronic device and wherein the additional information is presented on a second portable electronic device.

12. The method of claim 10, wherein the first set of characters "Y" is input into a device remote from the first electronic display.

13. The method of claim 10, wherein the item is a location.

14. The method of claim 10, wherein the item comprises electronic media, and wherein receiving additional information comprises displaying the electronic media on the display of the portable electronic device.

15. The method of claim 14, wherein the electronic media comprises at least one of a video recording, an audio recording, an article, and a publication.

16. A method for providing content related to a location of interest, comprising:
　　providing a map including a full name identifying a location on the map, the full name defined by a first set of characters "X" and including an imbedded Shortcode defined by a second set of characters "Y" selected from the first set of characters "X" of the full name that are visually distinguished from remaining characters of the first set of characters "X" of the full name, with "Y" being less than all of the first set of characters "X" of the full name and the remaining characters defining a third set of characters "Z," wherein "X" equals the sum of "Y" and "Z," and wherein the second set of characters "Y" of the full name are visually distinguished from the remaining letters of the full name by at least one of underlining, bolding, enlarging, changing the font, and changing the color of the second set of characters "Y" in the presentation of the full name relative to the third set of characters "Z";
　　receiving, via a network, an inquiry from an electronic device, the inquiry including the first set of characters "Y" defined by the imbedded Shortcode; and
　　sending, via the network to the electronic device, additional information regarding the location of interest for presentation on a display of the electronic device.

17. The method of claim 16, wherein the location is a destination, and wherein the information received is at least one of directions to and information about the destination.

18. The method of claim 16, wherein the map is presented on a static display.

19. The method of claim 18, wherein the static display comprises one of a paper map and a map on a billboard.

20. The method of claim 16, wherein the map is presented on a television.

21. The method of claim 16, wherein the map is presented on a website.

22. A method for creating and using an ISC database, comprising:
　　identifying an item of interest and assigning the item a full name;
　　assigning a Shortcode and imbedded Shortcode to the item, the Shortcode including less than all of the characters of the full name, the imbedded Shortcode comprising a visual representation of the full name with the characters of the Shortcode visually distinguished from the remaining characters of the full name; and
　　storing the full name, Shortcode, and imbedded Shortcode associated together within the ISC database.

23. The method of claim 22, further comprising storing additional information regarding the item of interest together with the full name, Shortcode, and imbedded Shortcode within the ISC database.

24. The method of claim 23, further comprising:
　　subsequently receiving an inquiry via a communication interface communicating with a network from a remote electronic device, the inquiry including the Shortcode; and
　　transmitting the additional information to the electronic device.

\* \* \* \* \*